US006977283B1

(12) United States Patent
Shutt et al.

(10) Patent No.: US 6,977,283 B1

(45) Date of Patent: Dec. 20, 2005

(54) POLYMERIZATION PROCESS

(75) Inventors: John R. Shutt, Houston, TX (US); Kevin R. Squire, Kingwood, TX (US); Abdulgaffar Vadgama, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1382 days.

(21) Appl. No.: 09/056,289

(22) Filed: Apr. 7, 1998

(51) Int. Cl.[7] .......................... C08F 4/64; C08F 210/08

(52) U.S. Cl. ............................ 526/71; 526/60; 526/64; 526/65; 526/68; 526/77; 526/170; 526/348; 526/348.2; 526/348.3; 526/348.4; 526/348.5; 526/348.6; 526/901; 526/912

(58) Field of Search .............................. 526/71, 77, 68, 526/160, 170, 901, 348–348.6, 912, 60, 64, 526/65

(56) References Cited

U.S. PATENT DOCUMENTS

| | | | |
|---|---|---|---|
| 5,017,714 | A | 5/1991 | Welborn, Jr. |
| 5,055,438 | A | 10/1991 | Canich |
| 5,066,736 | A | 11/1991 | Dumain et al. |
| 5,096,867 | A | 3/1992 | Canich |
| 5,126,414 | A | 6/1992 | Cooke et al. |
| 5,198,401 | A | 3/1993 | Turner et al. |
| 5,229,478 | A | 7/1993 | Floyd et al. |
| 5,264,405 | A | 11/1993 | Canich |
| 5,278,119 | A | 1/1994 | Turner et al. |
| 5,324,800 | A | 6/1994 | Welborn et al. |
| 5,332,706 | A | 7/1994 | Nowlin et al. |
| 5,384,299 | A | 1/1995 | Turner et al. |
| 5,408,017 | A | 4/1995 | Turner et al. |
| 5,427,991 | A | 6/1995 | Turner |
| 5,461,123 | A | 10/1995 | Song et al. |
| 5,473,028 | A | 12/1995 | Nowlin et al. |
| 5,491,207 | A | 2/1996 | Hoel |
| 5,492,975 | A | 2/1996 | Peifer et al. |
| 5,610,244 | A | 3/1997 | Govoni et al. |
| 5,621,126 | A | 4/1997 | Canich et al. |
| 5,627,242 | A | 5/1997 | Jacobsen et al. |
| 5,627,243 | A | 5/1997 | Hämäläinen et al. |
| 5,643,847 | A | 7/1997 | Walzer, Jr. |
| 5,661,095 | A | 8/1997 | Meverden et al. |

FOREIGN PATENT DOCUMENTS

| | | | |
|---|---|---|---|
| EP | 0 453 116 | A1 | 10/1991 |
| EP | 0 495 099 | A1 * | 7/1992 |
| EP | 0 575 875 | A | 12/1993 |
| EP | 0 624 604 | A | 11/1994 |
| EP | 0 643 078 | A | 3/1995 |
| WO | WO 93 25591 | A | 12/1993 |
| WO | WO 96/00246 | | 1/1996 |
| WO | WO 96/08520 | | 3/1996 |
| WO | WO 97/06186 | | 2/1997 |
| WO | WO 97/14721 | | 4/1997 |
| WO | WO 97/15602 | | 5/1997 |
| WO | WO 97/27224 | | 7/1997 |

* cited by examiner

*Primary Examiner*—Fred Teskin

(57) ABSTRACT

The present invention relates to a process for polymerizing monomer and comonomer(s) utilizing a bulky ligand transition metal metallocene-type catalyst or catalyst system, where the process is operated in the absence of or with a low amount of any of the isomers of the comonomer(s). The level of these isomers in the process of the invention are eliminated or maintained below a threshold level. It has been discovered that removal of certain isomers of the comonomer used in a polymerization process using metallocene-type catalysts results in an improved process.

110 Claims, No Drawings

POLYMERIZATION PROCESS

FIELD OF THE INVENTION

The present invention relates to a process for polymerizing one or more monomer(s) in the presence of a bulky ligand transition metal metallocene-type catalyst system in a polymerization environment in which the level of internal olefins, preferably isomers of any of the monomer(s), is reduced to or maintained at some threshold level or eliminated.

BACKGROUND OF THE INVENTION

The use of bulky ligand transition metal metallocene-type catalyst systems in polymerization processes to produce a diverse array of new polymers for use in a wide variety of applications and products is well known in the art. Typical bulky ligand transition metal metallocene-type compounds are generally described as containing one or more ligands capable of $\eta$-5 bonding to a transition metal atom, usually, cyclopentadienyl derived ligands or moieties, in combination with a transition metal selected from Group 4, 5 or 6 or from the lanthanide and actinide series of the Periodic Table of Elements. Exemplary of the development of these and other metallocene-type catalyst compounds and catalyst systems are described in U.S. Pat. Nos. 5,017,714, 5,055,438, 5,096,867, 5,198,401, 5,229,478, 5,264,405, 5,278,119, 5,324,800, 5,384,299, 5,408,017, 5,491,207 and 5,621,126 all of which are herein fully incorporated by reference.

Commercial scale polymerization processes that typically operate with a recycle system have had problems with reactor operability and maintaining consistent catalyst productivities. Commercial scale polymerization processes are distinct from most small or laboratory sized operations. Some industrial reagents or feed differ in purity from those typically used at the commercial level and often vary from supplier. The size of the commercial reactors and duration of the runs makes it more difficult to control various conditions and the like compared with a small laboratory reactor operating for a few hours or less. Generally, in commercial polymerization processes reactants and components entering the reactor are withdrawn from the reactor and are recycled back to the reactor. This recycle system is typically not something found on a small laboratory scale reactor. Also, commercial production usually is continuous and production extends over days or weeks. Thus, in a small scale operation upsets are not easily discoverable.

It is also well known that these metallocene-type catalyst systems have a tendency toward fouling and/or sheeting, particularly in a commercial process. For example, in a continuous slurry process fouling on the walls of the reactor, which acts as heat transfer surface, can result in many problems. Poor heat transfer during polymerization can result in polymer particles adhering to the walls of the reactor, where they can continue to polymerize. This can be detrimental to the process and can result in premature reactor shutdown. Also, depending upon the reactor conditions, some of the polymer may dissolve in the reactor diluent and redeposit on for example the metal heat exchanger surfaces.

In a continuous gas phase process for example, a continuous recycle stream is employed. The recycle stream composition is heated by the heat of polymerization, and in another part of the cycle, heat is removed by a cooling system external to the reactor. Fouling in a continuous gas phase process can lead to the ineffective operation of various reactor systems. For example, the cooling system, temperature probes and the distributor plate, which are often employed in a gas phase fluidized bed polymerization process can be affected. These upsets can lead to an early reactor shutdown.

As a result of the reactor operability issues associated with using bulky ligand transition metal metallocene-type catalysts and catalyst systems various techniques have been developed that are said to result in improved operability. Improved operability would include better catalyst productivity, improved polymer products and extended operation.

For example, various supporting procedures or methods for producing a metallocene-type catalyst system with reduced tendencies for fouling and better operability have been discussed in the art. U.S. Pat. No. 5,283,218 is directed towards the prepolymerization of a metallocene catalyst. U.S. Pat. Nos. 5,332,706 and 5,473,028 have resorted to a particular technique for forming a catalyst by "incipient impregnation". U.S. Pat. Nos. 5,427,991 and 5,643,847 describe the chemical bonding of non-coordinating anionic activators to supports. U.S. Pat. No. 5,492,975 discusses polymer bound metallocene-type catalyst systems. U.S. Pat. No. 5,661,095 discusses supporting a metallocene-type catalyst on a copolymer of an olefin and an unsaturated silane. PCT publication WO 97/06186 published Feb. 20, 1997 teaches removing inorganic and organic impurities after formation of the metallocene-type catalyst itself. PCT publication WO 97/15602 published May 1, 1997 discusses readily supportable metal complexes. PCT publication WO 97/27224 published Jul. 31, 1997 relates to forming a supported transition metal compound in the presence of an unsaturated organic compound having at least one terminal double bond.

Others have discussed different process modifications for improving operability. For example, PCT publication WO 97/14721 published Apr. 24, 1997 discusses the suppression of fines that can cause sheeting by adding an inert hydrocarbon to the process. U.S. Pat. No. 5,627,243 discusses a new type of distributor plate for use in fluidized bed gas phase reactors. PCT publication WO 96/08520 discusses avoiding the introduction of a scavenger into the reactor. U.S. Pat. No. 5,461,123 discusses using sound waves to reduce sheeting. EP 0 453 116 A1 published Oct. 23, 1991 discusses the introduction of antistatic agents for reducing the amount of sheets and agglomerates. U.S. Pat. No. 5,066,736 discusses the introduction of an activity retarder to the process to reduce agglomerates. U.S. Pat. No. 5,610,244 relates to feeding make-up monomer directly into the reactor above the bed to avoid fouling and improve polymer quality. U.S. Pat. No. 5,126,414 discusses including an oligomer removal system for reducing distributor plate fouling and providing for polymers free of gels.

There are various other known methods for improving operability including coating the polymerization equipment, injecting various agents into the reactor, controlling the polymerization rate, particularly on start-up, and reconfiguring the reactor design.

While all these possible solutions might reduce fouling or sheeting somewhat, some are expensive to employ and/or may not reduce both fouling and sheeting to a level sufficient for the successful operation of a continuous process, particularly in a commercial or large-scale process.

Thus, it would be advantageous to have a polymerization process capable of operating continuously, commercially, with enhanced reactor operability while at the same time producing polymers having improved physical properties. It would also be highly advantageous to have a continuously operating polymerization process having more stable catalyst productivities and reduced fouling/sheeting tendencies and increased duration of operation.

SUMMARY OF THE INVENTION

The invention in one embodiment provides for a process for polymerizing alpha-olefins in a reactor in the presence of a bulky ligand transition metal metallocene-type catalyst system, where the process comprises the step of removing at least a portion of any internal olefins from the process.

In one embodiment of the process of the invention, at least one monomer is an alpha-olefin having at least four carbon atoms, or the internal olefins may be positional and/or structural isomers of the alpha-olefin that can be present in the monomer feed or formed by isomerization in the process. Internal olefins may also be formed by dimerization and trimerization of alpha-olefins such as propylene and ethylene or combination thereof.

In a preferred embodiment the isomers are at least one di-substituted internal olefins and/or tri-substituted internal olefins. In an embodiment of the process of the invention, the removal step results in the overall lowering of the concentration of the internal olefins during the operation of the process. The step of removing applies, in one embodiment, to removing all such internal olefins or removing a selective group of internal olefins, those having an electronegativity value less than +0.093 Hartrees.

In another embodiment, the step of removing is performed at intervals upon the detection of a certain level of internal olefins and/or those internal olefins having an electronegativity value less than +0.093 Hartrees. The detection apparatus can be for example chromatographic techniques well known in the art and performed either in-line continuously or by periodic sampling or a combination thereof. Removal of the internal olefins can take place in for example the supply stream to the reactor, polymerization mixture or the recycle system where at least part of which is recycled to the reactor.

This invention provides for a process for polymerizing a monomer with one or more comonomers(s) in the presence of a bulky ligand transition metal metallocene-type catalyst system where the process is operated in the absence of at least one isomer of the comonomer(s) or maintaining at least one comonomer isomer(s) below a certain level in the feed stream composition that is returned to the reactor in a typical continuous process.

In an embodiment, the invention is directed to a continuous process for polymerizing ethylene and at least one comonomer having 4 or more carbon atoms in a reactor in the presence of a bulky ligand transition metal metallocene-type catalyst system, the process including the step of maintaining the level of one or more non-polar comonomer isomers in the feed at less than 5 weight percent of isomers based on the total weight of the comonomer and comonomer isomers in the feed to the reactor. In the above embodiment, the level of the one or more isomer(s) is measured, periodically or continuously, in the feed externally of the reactor and/or in the feed and polymer mixture inside the polymerization reactor to control the maintenance or reduction of the isomer levels.

In one embodiment, the invention provides for a continuous process for polymerizing ethylene or propylene and at least one comonomer having 4 or more carbon atoms in a reactor in the presence of a bulky ligand transition metal metallocene-type catalyst system where the process is operated and actively maintained at reduced levels of or essentially free of isomers of the comonomer having an electronegativity value less than +0.093 Hartrees.

In another embodiment, the invention provides for a continuous process for polymerizing ethylene and at least one comonomer having from 3 to 20 carbon atoms, preferably 4 to 20 carbon atoms, in the presence of a bulky ligand transition metallocene-type catalyst system in a reactor where the process comprises maintaining a level of isomers of the comonomer in the reactor to less than 5 weight percent based on the total weight percent of the isomer(s) entering the reactor. The isomer level can be maintained through monitoring of the levels of isomers of the comonomer and actively reducing all or a portion of the bad acting isomers.

In another embodiment, the invention provides for a polymerization process for producing a polyethylene copolymer in the presence of a bulky ligand transition metal metallocene-type catalyst system, the copolymer being polymerized from ethylene and at least one alpha-olefin comonomer having 4 or more carbon atoms, the process comprising the steps of: extracting at least a portion of a first isomer of the comonomer whereby the comonomer is at least partially depleted in the first isomer; polymerizing the partially depleted comonomer with ethylene to form a polymer product.

In a preferred embodiment, the process of the invention is preferably a continuous slurry or gas phase polymerization process.

DETAILED DESCRIPTION OF THE INVENTION

Introduction

The invention is directed toward a process for polymerizing monomer(s) in the presence of a bulky ligand transition metal metallocene type catalyst system, where the process has improved operability and capable of producing better polymer products. It has been discovered that internal olefins, in particular isomers, structural and positional, of typical monomers such as butene-1, 4-methyl-pentene-1, hexene-1 and octene-1 can cause reactor operability problems in polymerization processes, particularly, in a slurry and gas phase process. Typically in commercial polymerization operations it is the polar impurities that have been a source of process instabilities in the past. As a result, scavenging components have been used to suppress these polar impurities. However, in the present invention, it has been discovered that certain non-polar isomers of the comonomer and/or internal olefins, not appreciably affected by scavenging agents, have a disadvantageous effect, in particular, in a commercial scale continuous operation. The relationship of concentration build up of certain internal olefins having a detrimental effect on a polymerization process employing bulky ligand transition metal metallocene type catalysts has gone unrecognized until now. In particular, the invention is especially applicable to a continuous polymerization process having a recycle system. The recycle system provides a means for returning non-polymerized alpha-olefins and internal olefins and other components to the reactor. As a consequence of returning the recycle system to the reactor, these internal olefins increase to levels that interfere with polymerization.

It has been surprisingly discovered that the reduction, elimination or removal of those isomers, particularly those having electronegativity values lower than that of the comonomer utilized, results in an improved polymerization process. As a result of the removal or elimination of these isomers or internal olefins, or simply maintaining below a certain threshold level, it has been found that catalyst productivity is increased and that the resulting polymer has improved particle morphology and more random comonomer incorporation into the polymer backbone. Also, maintaining the level of these isomers to a low level in a continuous polymerization process provides for improved process operability, less fouling and sheeting, and improved catalyst productivities.

Catalyst Components and Catalyst Systems

Bulky ligand transition metallocene-type catalyst compounds include half and full sandwhich compounds having one or more bulky ligands including cyclopentadienyl structures or other similar functioning structure such as pentadiene, cyclooctatetraendiyl and imides. The bulky ligands are capable of η-5 bonding to a transition metal atom, for example from Group 4, 5 and 6 of the Periodic Table of Elements.

Bulky ligand transition metallocene-type catalyst systems of the invention are formed from the bulky ligand metallocene-type catalyst compound represented by the formula:

$$(LP)_m M(A^q)_n(E^r)_o \quad (I)$$

where L is a bulky ligand, substituted or unsubstituted; M is a transition metal, A, and p, m, q and n are as defined above and E is an anionic leaving group such as but not limited to hydrocarbyl, hydride, halide, carboxylate or combination thereof or any other anionic ligands; r is the anionic charge of E and o is the number of E ligands and o is 1, 2, 3 or 4 such that (p×m)+(q×n)+(r×o) is equal to the formal oxidation state of the metal center; and activated by an activation system. The activation system may be an aluminum alkyl, alumoxane, modified alumoxane or any other oxy-containing organometallic compound or non-coordinating activators, or a combination thereof.

In another embodiment, when using non-coordinating activators, the bulky ligand transition metallocene-type catalyst systems of the invention are typically those complexes of the formula:

$$\{[(LP)_m M(A^q)_n]^{+k}\}_h [B'^{-j}]_i \quad (II)$$

where L is a substituted or unsubstituted bulky ligand bonded to M, p is the anionic charge of L and m is the number of L ligands and m is 1, 2 or 3; A is a ligand bonded to M and capable of inserting an olefin between the M—A bond, q is the anionic charge of A and n is the number of A ligands and n is 1, 2, 3 or 4, M is a transition metal, and (p×m)+(q×n)+k corresponds to the formal oxidation state of the metal center; where k is the charge on the cation and k is 1, 2, 3 or 4, and B' is a chemically stable, non-nucleophillic anionic complex, preferably having a molecular diameter of 4 Å or greater and j is the anionic charge on B', h is the number of cations of charge k, and i the number of anions of charge j such that h×k=j×i. Such a system may be added preformed to the polymerization or produced in situ the polymerization.

In formulas (I) and (II) above, any two L and/or A ligands may be bridged to each other and/or unbridged. The catalyst compound may be full-sandwich compounds having two or more ligands L, which are cyclopentadienyl derived ligands or substituted cyclopentadienyl derived ligands, or half-sandwich compounds having one ligand L, which is a cyclopentadienyl derived ligand or heteroatom substituted cyclopentadienyl derived ligand or hydrocarbyl substituted cyclopentadienyl derived ligand or moiety such as an indenyl ligand, a benzindenyl ligand or a fluorenyl ligand, an octahydrofluorenyl ligand, a cyclooctatetraendiyl ligand, an azenyl ligand and the like, including hydrogenated versions thereof or any other ligand structure capable of η-5 bonding to the transition metal atom. One or more of these bulky ligands is π-bonded to the transition metal atom; each L can be substituted with a combination, which can be the same or different. Non-limiting examples of substituents include hydrogen or linear, branched alkyl radicals or cyclic alkyl, alkenyl, alkynl or aryl radicals or combination thereof having from 1 to 30 carbon atoms or other substituents having up to 50 non-hydrogen atoms that can also be substituted. Non-limiting examples of alkyl substituents include methyl, ethyl, propyl, butyl, pentyl, hexyl, cyclopentyl, cyclohexyl, benzyl or phenyl groups and the like, including all their isomers, for example tertiary butyl, isopropyl etc. Non-hydrogen substituents include the atoms carbon, silicon, nitrogen, oxygen, tin, germanium and the like including olefins. L may also be other types of bulky ligands including but not limited to bulky amides, phosphides, alkoxides, aryloxides, imides, carbolides, borollides, porphyrins, phthalocyanines, corrins and other polyazomacrocycles. The metal atom, from the Periodic Table of the Elements, may be a Group 3 to 10 metal, preferably, a Group 4, 5 or 6 transition metal or a metal from the lanthanide or actinide series, more preferably the transition metal is from Group 4. Other ligands may be bonded to the transition metal, such as a leaving group, such as but not limited to weak bases such as amines, phosphines, ether, carboxylates, dienes, hydrocarbyl radicals having from 1 to 20 carbon atoms or halogens and the like. In addition to the transition metal, these ligands may be optionally bonded to A or L. Non-limiting examples of catalyst components and catalyst systems are discussed in for example, U.S. Pat. Nos. 4,530,914, 4,871,705, 4,937,299, 5,124,418, 5,017,714, 5,120,867, 5,210,352, 5,278,264, 5,278,119, 5,304,614, 5,324,800, 5,347,025, 5,350,723, 5,391,790, 5,391,789, 5,399,636, 5,539,124, 5,455,366, 5,534,473, 5,684,098, 5,693,730, 5,698,634, 5,710,297, 5,712,354, 5,714,427, 5,714,555, 5,728,641 and 5,728,839 all of which are herein fully incorporated by reference. Also, the disclosures of European publications EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455 and WO 98/06759 are all herein fully incorporated by reference.

In one embodiment of the invention the metallocene-type catalyst compound of the invention includes monocyclopentadienyl heteroatom containing transition metal metallocene-type compounds. These metallocene-type compounds are activated by an alumoxane, modified alumoxane, a non-coordinating activator, a Lewis acid or a combination thereof to form an active polymerization catalyst system. These types of catalyst systems are described in, for example, PCT publication WO 92/00333, WO 94/07928, WO 91/04257, WO 94/03506, WO96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference. Additionally it is within the scope of this invention that the metallocene catalysts and catalyst systems may be those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401 and 5,723,398 and PCT publications WO 93/08221, WO 93/08199 and WO 95/07140 and European publications EP-A-0 578 838, EP-A-0 638 595, EP-B-0 513 380 and EP-A1-0 816 372, all of which are herein fully incorporated by reference.

The preferred transition metal component of the metallocene-type catalyst of the invention are those of Group 4, particularly, titanium, zirconium and hafnium. The transition metal may be in any formal oxidation state, preferably +2, +3 or +4 or a mixture thereof, more preferably +4.

In one embodiment, the catalyst component is represented by the formula:

$$C_5H_{5-d-f}R''_d)_eR'''_fMQ_{g-e} \qquad \text{(III)}$$

wherein M is a Group 4, 5, 6 transition metal, $(C_5H_{5-d-f}R''_d)$ is the same or different unsubstituted or substituted cyclopentadienyl ligand bonded to M, each R", which can be the same or different, is hydrogen or a substituent group containing up to 50 non-hydrogen atoms or substituted or unsubstituted hydrocarbyl having from 1 to 30 carbon atoms or combinations thereof, or two or more carbon atoms are joined together to form a part of a substituted or unsubstituted ring or ring system having 4 to 30 carbon atoms, R''' is one or more or a combination of carbon, germanium, silicon, tin, phosphorous or nitrogen atoms containing radical bridging two $(C_5H_{5-d-f}R''_d)$ ligands, or bridging one $(C_5H_{5-d-f}R''_d)$ ligand to M; each Q which can be the same or different is a hydride, substituted or unsubstituted hydrocarbyl having from 1 to 30 carbon atoms, halogen, alkoxides, aryloxides, amides, phosphides, or any other univalent anionic ligand or combination thereof; also, two Q's together form an alkylidene ligand or cyclometallated hydrocarbyl ligand or other divalent anionic chelating ligand, where g is an integer corresponding to the formal oxidation state of M, d is 0, 1, 2, 3, 4 or 5, f is 0 or 1 and e is 1, 2 or 3.

In another preferred embodiment of this invention the monocylopentadienyl catalyst component is represented by the formula:

(IV)

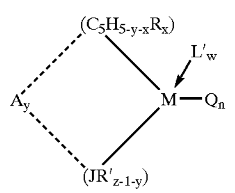

wherein M is Ti, Zr or Hf; $(C_5H_{5-y-x}R_x)$ is a cyclopentadienyl ring which is substituted with from 0 to 5 substituent groups R, "x" is 0, 1, 2, 3, 4 or 5 denoting the degree of substitution, and each substituent group R is, independently, a radical selected from a group consisting of $C_1$–$C_{20}$ hydrocarbyl radicals, substituted $C_1$–$C_{20}$ hydrocarbyl radicals wherein one or more hydrogen atoms is replaced by a halogen atom, $C_1$–$C_{20}$ hydrocarbyl-substituted metalloid radicals wherein the metalloid is selected from the Group 14 of the Periodic Table of Elements, and halogen radicals or $(C_5H_{5-y-x}R_x)$ is a cyclopentadienyl ring in which two adjacent R-groups are joined forming $C_4$–$C_{20}$ ring to give a saturated or unsaturated polycyclic cyclopentadienyl ligand such as indenyl, tetrahydroindenyl, fluorenyl or octahydrofluorenyl;

$(JR'_{z-1-y})$ is a heteroatom ligand in which J is an element with a coordination number of three from Group 15 or an element with a coordination number of two from Group 16 of the Periodic Table of Elements, preferably nitrogen, phosphorus, oxygen or sulfur with nitrogen being preferred, and each R' is, independently a radical selected from a group consisting of $C_1$–$C_{20}$ hydrocarbyl radicals wherein one or more hydrogen atoms is replaced by a halogen atom, y is 0 or 1, and "z" is the coordination number of the element J;

each Q is, independently any univalent anionic ligand such as halogen, hydride, or substituted or unsubstituted $C_1$–$C_{30}$ hydrocarbyl, alkoxide, aryloxide, amide or phosphide, provided that two Q may be an alkylidene, a cyclometallated hydrocarbyl or any other divalent anionic chelating ligand; and n may be 0, 1 or 2;

A is a covalent bridging group containing a Group 15 or 14 element such as, but not limited to, a dialkyl, alkylaryl or diaryl silicon or germanium radical, alkyl or aryl phosphine or amine radical, or a hydrocarbyl radical such as methylene, ethylene and the like;

L' is a Lewis base such as diethylether, tetraethylammonium chloride, tetrahydrofuran, dimethylaniline, aniline, trimethylphosphine, n-butylamine, and the like; and w is a number from 0 to 3. Additionally, L' may be bonded to any of R, R' or Q and n is 0, 1, 2 or 3.

It is contemplated in some embodiments, that the bulky ligands of the metallocene-type catalyst compound of the invention described above are asymmetrically substituted in terms of additional substituents or types of substituents, and/or unbalanced in terms of the number of additional substituents on the bulky ligands or the bulky ligands themselves are different. It is also contemplated that in one embodiment, the metallocene-type catalysts of the invention include their structural or optical or enantiomeric isomers and mixtures thereof.

For the purposes of this patent specification and appended claims, the term "activator" is defined to be any compound or component which can activate a bulky ligand transition metal metallocene-type catalyst compound as described above, for example, a Lewis acid or a non-coordinating ionic activator or ionizing activator or any other compound that can convert a neutral metallocene catalyst component to a metallocene cation. It is within the scope of this invention to use alumoxane or modified alumoxane as an activator, and/or to also use ionizing activators, neutral or ionic, such as tri(n-butyl)ammonium tetrakis (pentafluorophenyl)boron or a trisperfluorophenyl boron metalloid precursor which ionize the neutral metallocene compound.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253 and 5,731,451 and European publications EP-A-0 561 476, EP-B 1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299 and 5,502,124 and U.S. patent application Ser.

No. 08/285,380, filed Aug. 3, 1994, all of which are herein fully incorporated by reference. Other activators include those described in PCT publication WO 98/07515 such as tris(2,2',2"-nonafluorobiphenyl)fluoroaluminate, which is fully incorporated herein by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410 all of which are herein fully incorporated by reference. Also, methods of activation such as using radiation and the like are also contemplated as activators for the purposes of this invention.

In an embodiment of the invention two or more bulky ligand transition metal metallocene-type catalyst compounds as described above can be combined to form a catalyst system useful in the invention. For example, those mixed catalysts described in U.S. Pat. Nos. 5,281,679, 5,359,015, 5,470,811, and 5,719,241 all of which are herein fully incorporated herein reference. In another embodiment of the catalyst system of the invention combinations of one or more of catalyst components of the formulas (I) and/or (IV) are contemplated.

In one embodiment, metallocene catalyst components can be combined to form the blend compositions as described in PCT publication WO 90/03414 published Apr. 5, 1990, herein fully incorporated by reference. In yet another embodiment of the invention mixed metallocenes as described in U.S. Pat. Nos. 4,937,299 and 4,935,474, both are herein fully incorporated herein by reference, can be used to produce polymers having a broad molecular weight distribution and/or a multimodal molecular weight distribution.

In another embodiment of the invention at least one metallocene catalyst of the invention can be combined with a non-metallocene or traditional Ziegler-Natta catalyst (excludes a cyclopentadienyl containing moiety) or catalyst system, or chromium based catalysts or catalyst systems, non-limiting examples are described in U.S. Pat. Nos. 4,159,965, 4,325,837, 4,701,432, 5,124,418, 5,077,255, 5,183,867, 5,391,660, 5,395,810, 5,691,264 and 5,723,399 all of which are herein fully incorporated by reference.

It is within the scope of this invention, in one embodiment, that $Ni^{2+}$ and $Pd^{2+}$ complexes described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996 which are all herein fully incorporated by reference, can be used in the process of invention, or in combination with the other metallocene-type catalysts described above. These complexes can be either dialkyl ether adducts, or alkylated reaction products of the described dihalide complexes that can be activated to a cationic state by the activators of this invention. It is also within the scope of the process of this invention that the above described complexes can be combined with one or more of the catalyst compounds represented by formula (III) and (IV), with one or more activators, and with one or more of the support materials using one of the support methods that are described below.

For purposes of this patent specification the terms "carrier" or "support" are interchangeable and can be any support material, preferably a porous support material, for example, talc, inorganic oxides, inorganic chlorides, and magnesium chloride, and resinous support materials such as polystyrene or polystyrene divinyl benzene polyolefins or polymeric compounds or any other organic or inorganic support material and the like, or mixtures thereof.

The preferred support materials are inorganic oxide materials, which include those of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina, and magnesia, titania, zirconia, montmorillonite and the like or combination thereof, for example, silica-chromium, silica-titania.

It is preferred that the carrier of the catalyst of this invention, preferably an inorganic oxide, has a surface area in the range of from about 10 to about 700 $m^2/g$, pore volume in the range of from about 0.1 to about 4.0 cc/g and average particle size in the range of from about 10 to about 500 $\mu$m. More preferably, the surface area is in the range of from about 50 to about 500 $m^2/g$, pore volume of from about 0.5 to about 3.5 cc/g and average particle size of from about 20 to about 200 $\mu$m. Most preferably the surface area range is from about 100 to about 400 $m^2/g$, pore volume from about 0.8 to about 3.0 cc/g and average particle size is from about 20 to about 100 $\mu$m. The average pore size of the carrier of the invention typically has pore size in the range of from 10 to 1000 Å, preferably 50 to about 500 Å, and most preferably 75 to about 350 Å.

The catalyst system of the invention can be made and used in a variety of different ways as described below. In one embodiment the catalyst is unsupported, preferably in liquid form such as described in U.S. Pat. Nos. 5,317,036 and 5,693,727 and European publication EP-A-0 593 083, all of which are herein incorporated by reference. The catalyst in liquid form can be fed to the reactor as described in PCT publication WO 97/46599, which is fully incorporated herein by reference. In the preferred embodiment, the catalyst system of the invention is supported. Examples of supporting the catalyst system used in the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402 and 5,731,261 and U.S. Application Ser. Ns. 271,598 filed Jul. 7, 1994 and Ser. No. 788,736 filed Jan. 23, 1997 and PCT publications WO 95/32995, WO 95/14044, WO 96/06187 and WO 97/02297 all of which are herein fully incorporated by reference.

In another embodiment, the catalyst system of the invention contains a polymer bound ligand as described in U.S. Pat. No. 5,473,202 which is herein fully incorporated by reference. In one embodiment the catalyst system of the invention is spray dried as described in U.S. Pat. No. 5,648,310 which is fully incorporated herein by reference. In an embodiment the support of the invention is functionalized as described in European publication EP-A-0 802 203 or at least one substituent or leaving group is selected as described in U.S. Pat. No. 5,688,880, both of which are herein fully incorporated by reference.

In one embodiment of the process of the invention, olefin(s), preferably $C_2$ to $C_{30}$ olefin(s) or alpha-olefin(s), preferably ethylene or propylene or combinations thereof are prepolymerized in the presence of the catalyst or catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. Nos. 4,923,833, 4,921,825, 5,283,278 and 5,705,578 and European publication EP-B-0279 863 and PCT Publication WO 97/44371 all of which are herein fully incorporated by reference.

In another embodiment of the invention, the supported catalyst system of the invention includes an antistatic agent or surface modifier, for example, those described in U.S. Pat. No. 5,283,278 and PCT publication WO 96/11960 which are herein fully incorporated by reference. Non-limiting examples of antistatic agents and surface modifiers include alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention, however, it is preferred that it is added after the supported catalyst system of the invention is formed, in either a slurry or dried state.

A preferred method for producing the catalyst of the invention is described below and can be found in U.S. application Ser. No. 265,533, filed Jun. 24, 1994 and Ser. No. 265,532, filed Jun. 24, 1994 and PCT publications WO 96/00245 and WO 96/00243 both published Jan. 4, 1996, all of which are herein fully incorporated by reference. In a preferred embodiment, the metallocene-type catalyst component is slurried in a liquid to form a metallocene solution and a separate solution is formed containing an activator and a liquid. The liquid can be any compatible solvent or other liquid capable of forming a solution or the like with at least one metallocene catalyst component and/or at least one activator. In the preferred embodiment the liquid is a cyclic aliphatic or aromatic hydrocarbon, most preferably toluene. The metallocene and activator solutions are mixed together and added to a porous support or the porous support is added to the solutions such that the total volume of the metallocene solution and the activator solution or the metallocene and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total Porosity and Particle Density of Fluid Catalysts By Liquid Titration*, Vol. 28, No. 3, Analytical Chemistry 332–334 (March, 1956).

The mole ratio of the metal of the activator component to the transition metal of the metallocene component is in the range of ratios between 0.3:1 to 1000:1, preferably 20:1 to 800:1, and most preferably 50:1 to 500:1. Where the activator is an aluminum-free ionizing activator such as those based on the anion tetrakis(pentafluorophenyl)boron, the mole ratio of the metal of the activator component to the transition metal component is preferably in the range of ratios between 0.3:1 to 3:1.

In another embodiment the catalyst loading in millimoles (mmoles) of metallocene to weight of support catalyst in grams (g) is in the range of from about 0.001 to about 2.0 mmoles of metallocene per g of support material, preferably from about 0.005 to about 1.0, more preferably from about 0.005 to 0.5 and most preferably from about 0.01 to 0.05.

In one embodiment, the catalyst of the invention has a catalyst productivity of greater than 1000 grams of polymer per gram of the total metallocene catalyst system including all its components, for example, activator and support if used, preferably greater than 2000 grams of polymer per gram of metallocene catalyst system, more preferably greater than 2500 grams of polymer per gram of metallocene catalyst system, even more preferably greater than 3000 grams of polymer per gram of metallocene catalyst system, and most preferably greater than 3500 grams of polymer per gram of metallocene catalyst system.

Polymerization Process of the Invention

The catalysts and catalyst systems described above are suitable for use in the polymerization process of the invention. The polymerization process of the invention includes a solution, gas or slurry process or a combination thereof, most preferably a gas or slurry phase process.

In an embodiment, this invention is directed toward the solution, slurry or gas phase polymerization or copolymerization reactions involving the polymerization of one or more of the monomers having from 2 to 30 carbon atoms, preferably 2–12 carbon atoms, and more preferably 2 to 8 carbon atoms. The invention is particularly well suited to the copolymerization reactions involving the polymerization of one or more olefin monomers of ethylene, propylene, butene-1, pentene-1,4-methyl-pentene-1, hexene-1, octene-1, decene-1, and cyclic olefins or a combination thereof. Other monomers can include vinyl monomers, diolefins such as dienes, polyenes, norbornene, norbornadiene monomers. Preferably a copolymer of ethylene is produced, where the comonomer is at least one alpha-olefin having from 4 to 15 carbon atoms, preferably from 4 to 12 carbon atoms, more preferably from 4 to 8 carbon atoms and most preferably from 4 to 7 carbon atoms.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In the most preferred embodiment the process of the invention relates to the polymerization of ethylene and at least one comonomer having from 4 to 8 carbon atoms, preferably 4 to 7 carbon atoms. Particularly, the comonomers are butene-1,4-methyl-pentene-1, hexene-1 and octene-1, the most preferred being hexene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

The settled bulk density for the polymers produced by the process of invention are in the range of from about 10 to 35 lb/ft$^3$ (160 to 561 kg/m$^3$), preferably from about 12 to 35 lb/ft$^3$ (193 to 561 kg/m$^3$), more preferably from about 14 to 32 lb/ft$^3$ (224 to 513 kg/m$^3$), and most preferably from about 15 to 30 lb/ft$^3$ (240 to 481 kg/m$^3$).

The productivity of the catalyst or catalyst system is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent.

A preferred process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference.

In one embodiment of the process of the invention, the process is operating continuously for more than 5 hours, preferably more than 12 hours, even more preferably more than a day and still even more preferably more than 36 hours, and most preferably more than a 2 days, preferably more than a week.

In another embodiment of the process of the invention, the process is operating continuously for more than 6 hours to about 2 days, preferably more than 12 hours, prior to the removal of all or a portion of the isomer(s) or internal olefins of the comonomer having electronegativity values less than +0.093 Hartrees.

In one embodiment, the process of the invention comprises a reactor and a recycle system comprising a recycle composition containing fresh monomer, unpolymerized monomer, unpolymerized comonomer, fresh comonomer, optionally hydrogen and other inert liquids and gases, for example, nitrogen, isobutane and isopentane. In this process of the invention the recycle composition is subjected to a means for removing all or a portion of the undesirable isomers or of the comonomers or internal olefins built up in the system during polymerization. These undesirable isomers or internal olefins, especially those having electronegativity values less than +0.093 Hartrees, can be eliminated, reduced or maintained at a satisfactory level, by subjecting the recycle composition, for example, to a distillation process as is well known in the art for separating non-polar olefins. As one in the art will appreciate the extent of removal is dependent on the number of distillation stages and the differences in the boiling points of the isomers of the comonomer or internal olefins.

The recycle system can be separated into one or more separate secondary recycle systems where at least one such secondary system's recycle composition is distilled and returned to the reactor. Alternatively, or in combination, at least one secondary recycle system, once its composition is distilled, can be returned to the main recycle system or directly to the reactor. Table 1 below provides some representative boiling points for various olefins.

TABLE 1

| Olefins | Boiling Point (° C.) |
|---|---|
| 4-methyl-pentene-1 | 53.9 |
| 3-methyl-pentene-1 | 54.1 |
| Cis-4-methyl-pentene-2 | 56.3 |
| Trans-4-methyl-pentene-2 | 58.6 |
| 2-methyl-pentene-1 | 60.7 |
| Hexene-1 | 63.5 |
| 2-ethyl-butene-1 | 64.7 |
| Trans-hexene-3 | 67.1 |
| Cis-hexene-3 | 66.4 |
| Trans-hexene-2 | 67.9 |
| Cis-hexene-2 | 68.8 |
| 2-methyl-pentene-2 | 67.3 |
| Cis-3-methyl-pentene-2 | 70.5 |
| Trans-3-methyl-pentene-2 | 67.6 |
| Butene-1 | −6.3 |
| Trans-Butene-2 | 0.9 |
| Cis-Butene-2 | 3.7 |
| Trans-2-methyl-heptene-3 | 112 |
| 2-methyl-heptene-1 | 119.3 |
| Octene-1 | 121.3 |
| 2-methyl-heptene-2 | 122.6 |
| Cis-Octene-3 | 122.9 |
| Trans-Octene-3 | 123.3 |
| Trans-Octene-2 | 125.0 |
| Cis-Octene-2 | 125.6 |
| Cis-3-methyl-heptene-2 | 123.2 |
| Trans-3-methyl-heptene-2 | 124.5 |
| 3-methyl-heptene-3 | 121.1 |

In one embodiment of the process of the invention, the recycle composition is subjected to distillation to separate and allow removal of a majority of the hexene-1 isomers having an electronegativity value below +0.093 Hartrees and having boiling points above about 67° C. It is understood that some benign isomers such as cis- and trans-hexene-3 may also be removed in the process for distilling the recycle composition. However, this too maybe beneficial, in that there is the increased possibility that more hexene-2 will isomerize to hexene-3. For octene-1, distillation is harder because of the proximity of boiling points and thus the number of distillation stages is even more important.

In another embodiment of the invention, the process is operated in a reactor having a recycle system that enters and exits the reactor, the recycle system comprises a recycle composition where all or a portion of the recycle composition is subjected to static zeolite technology that is well known in the art for separating branched from linear olefins and/or all or a portion of the recycle composition is subjected to an acid catalyzed process, for example, treating the recycle composition with methanol. While it is understood some of these techniques may separate out different non-polar olefins, it is contemplated that one versed in the art may choose to use more than one technique at a time.

In an embodiment of the process of the invention, preferably greater than 50 percent of the isomer(s) of the comonomer based on the total weight percent of the comonomer and isomers of the comonomer are removed from the recycle composition prior to reintroducing the recycle composition back into the reactor, more preferably greater than 60 percent, even more preferably greater than 70 percent, still more preferably greater than 80 percent and most preferably greater than 90 percent. Preferably, the isomer(s) of the comonomer removed are those having electronegativity values less than +0.093 Hartrees.

In an embodiment of the process of the invention, preferably greater than 50 percent of the internal olefins based on the total weight percent of the comonomer and internal olefins are removed from the recycle composition prior to reintroducing the recycle composition back into the reactor, more preferably greater than 60 percent, even more preferably greater than 70 percent, still more preferably greater than 80 percent and most preferably greater than 90 percent.

Preferably, the isomer(s) of the comonomer or internal olefins removed are those having electronegativity values less than +0.093 Hartrees.

In yet another embodiment of the invention, the process is operated in a reactor having a recycle system that enters and exits the reactor, the recycle system comprises a recycle composition where a portion of the recycle composition is taken off in a slip stream where it is subjected to one or more processes in the art for removing non-polar olefins. The slip stream is then, optionally, returned to the recycle stream or the reactor having had a majority of the undesirable olefins removed. Thus, the total undesirable olefins returning to the reactor is maintained at a desirable level, such as less than 3 weight percent, preferably less than 0.2 weight percent, even more preferably less than 0.15 weight percent, and most preferably less than 0.1 weight percent based on the total weight percent of comonomer and the undesirable olefins in the recycle system. Preferably, the undesirable olefins have electronegativity values less than +0.093 Hartrees.

In an embodiment of the process of the invention where the recycle composition is taken off in a slip stream that is returned to the recycle system or reactor directly, greater than 50 percent of the isomer(s) of the comonomer are removed from the composition of the slip stream, preferably greater than 60 percent, more preferably greater than 70 percent, still more preferably greater than 80 percent and most preferably greater than 90 percent based on the total weight of the comonomer and the isomer(s) of the comonomer.

In still yet another embodiment of the invention above, the slip stream is simply distributed to another process and not back to the same reactor or recycle system. In one embodiment the slip stream is distributed to another reactor or another recycle stream of another process, for example a process for polymerizing olefins in the presence of a traditional Ziegler-Natta catalyst system or a chromium metal based catalyst system, for example a Phillips-type catalyst.

In embodiments of the invention where a portion of the recycle composition is removed, fresh comonomer and other gases and liquids are added to restore the recycle composition.

Without regard to process, a continuous industrial polymerization system recycles as much of the polymerization components, such as isobutane in a slurry process and unconverted monomer(s) in a gas phase process as economically possible. As a result of this, the level of comonomer isomers entering the reactor can increase over time. The isomers may be present in commercially available comonomer(s), such as isomers of hexene-1 that include hexene-2, hexene-3, 3-methyl-pentene-1, 2-ethyl-butene-1,3-methyl-pentene-2 and sometimes, 2-methyl-pentene-2 or possibly as an impurity in the preferred main monomer ethylene, or as a product of olefin isomerization catalyzed by the copolymerization catalyst.

For example, hexene-1 comonomer is available from numerous suppliers including Shell Chemical Company, Houston, Tex. and Chevron Corporation, San Francisco, Calif. Typically, depending on the supplier, the fresh hexene-1, that is hexene-1 that is not a recycled comonomer in a polymerization process, contains about 99.2 weight percent hexene-1 with about 0 weight percent cis- and trans-3-methyl-pentene-2 and about 0.10 weight percent cis- and trans-hexene-2. As a consequence of using hexene-1 for example, the hexene-1 comonomer can be slowly isomerized to cis- and trans-hexene-2 and cis- and trans-hexene-3, which build up in the recycle system of a polymerization process and are not readily polymerizable. Also, the isomers 3-methyl-pentene-1 and 2-ethyl-butene-1 can slowly isomerize to cis- and trans-3-methyl-pentene-2.

While not wishing to be bound to any theory, it is believed that isomerization of the comonomers can be a result of the polymerization process itself, for example the polymerization catalyst or components thereof such as the alumoxane or trimethylaluminum, or a scavenger such as triethylaluminum, or a system external to the process, for example, an olefin purification system that treats the olefins by subjecting them to a treatment such as percolation over a fixed bed of activated alumina and/or molecular sieve. For example, a 13× molecular sieve is more likely to isomerize hexene-1 than a 3 Å molecular sieve or alumina. Sometimes supported copper catalyst treatments of olefins are used that can result in the isomerization from terminal to internal olefins.

In one embodiment of the process of the invention, non-limiting examples of the isomers, individually or in combination, to be removed completely or reduced in concentration during the process of the invention include cis-3-methyl-pentene-2, trans-3-methyl-pentene-2, cis-hexene-2, trans-hexene-2,2-methyl-pentene-2, cis-3-methyl-heptene-2, trans-3-methyl-heptene-2, cis-3-methyl-heptene-3, trans-3-methyl-heptene-3, trans-4-methyl-pentene-2,2-methyl-heptene-2, cis-butene-2, trans-butene-2,2-methyl-butene-2,2,3-dimethyl-butene-2, cis-2-methyl-heptene-3, trans-2-methyl-heptene-3, cis-3-methyl-hexene-2, trans-3-methyl-hexene-2, cis-3-methyl-hexene-3, trans-3-methyl-hexene-3,2-methyl-hexene-2, cis-3-methyl-octene-2, trans-3-methyl-octene-2, cis-3-methyl-octene-3, trans-3-methyl-octene-3,2-methyl-octene-2, cis-2-methyl-octene-3, trans-2-methyl-octene-3, cis-octene-2, trans-octene-2, cis-3-methyl-nonene-2, trans-3-methyl-nonene-2, cis-3-methyl-nonene-3, trans-3-methyl-nonene-3,2-methyl-nonene-2, cis-decene-2 and trans-decene-2. Non-limiting examples of isomers causing little to no effect on the process of the invention include cis-hexene-3 and trans-hexene-3. The isomers 3-methyl-pentene-1 and 2-ethyl-butene-1 both may isomerize to cis- and trans-3-methyl-pentene-2 during the polymerization process.

In one embodiment of the process of the invention the isomers or internal olefins, individually or in combination, to be removed completely or reduced in concentration have from 3 to 20 carbon atoms, preferably from 4 to 12 carbon atoms, more preferably 4 to 8 carbon atoms.

In an embodiment of the process of the invention the electronegativity of the isomers of the comonomer in the process lower than +0.093 Hartrees (1 Hartree is approximately equal to 27.21 electron volts (eV)) are preferably removed completely or reduced in concentration during the process of the invention. Typically, the electronegativity value of ethylene is +0.116 Hartrees, propylene is +0.103 Hartrees, butene-1 is +0.104 Hartrees and hexene-1 is +0.102 Hartrees. The lower the Hartree value, that is the closer to zero, the stronger the Lewis base activity, and apparently, the greater the effect of the isomer on the process of the invention. While not wishing to be bound to any theory, it is believed that the more electronegative isomers tend to complex with the electropositive transition metal of the metallocene-type catalyst, potentially disturbing its catalytic performance.

It has also been discovered that the metallocene-type catalyst compounds that include a structural bridge joining two or more bulky ligands or bridging a bulky ligand directly, preferably indirectly, to the transition metal, are more sensitive to the electronegative isomers than the unbridged metallocene-type catalyst compounds. In an embodiment of the invention, the bulky ligand transition metal metallocene-type catalyst compounds of the invention have Hartree values in the range of from +0.24 to +0.36, particularly those catalyst compounds containing the transition metals Ti, Zr or Hf.

For purposes of this patent specification and appended claims the term "comonomer olefin(s)" refers to a non-polar olefin having the same number of carbon atoms as the comonomer.

In an embodiment of the process of the invention, the weight percent of the total of the isomers of the comonomer(s) having an electronegativity value of less than +0.093 Hartrees is maintained at less than 5 weight percent based on the total weight percent of the comonomer(s) and isomers of the comonomer(s) in the recycle stream in a gas phase process or in the reactor diluent or reactor composition in a slurry or solution process, preferably less than 3 weight percent, more preferably less than 1 weight percent, even more preferably less than 0.2 weight percent and most preferably less than 0.1 weight percent.

In another embodiment of the process of the invention, the sum of the electronegative isomers of the comonomer and the comonomer having less than +0.093 Hartrees is maintained at less than 5 weight percent based on the total weight percent of comonomer and isomers of the comonomer, and the isomers of the comonomer having less than +0.093 Hartrees, preferably, less than 0.5 weight percent, most preferably less than 0.2 weight percent.

In another embodiment of the process of the invention, where two or more comonomers are used, for example hexene-1 and octene-1, then the aggregate of the isomers of the comonomers having an electronegativety value of less than +0.093 Hartrees for each comonomer is maintained at less than 5 weight percent based on the total weight percent of the comonomers and isomers of the comonomer present in the recycle stream or the reactor diluent, preferably less than 0.5 weight percent, and more preferably less than 0.2 weight percent, and most preferably less than 0.1 weight percent.

In one embodiment of the process of the invention, where the comonomer is 4-methyl-pentene-1, the possible isomers include 2-methyl-pentene-2,2-methyl-pentene-1 and cis- and trans-4-methyl-pentene-2. It is preferable that in the process of the invention where the comonomer is 4-methyl-pentene-1, the isomer 2-methyl-pentene-2 having an electronegativity value of +0.086 Hartrees and/or trans-4-methyl-pentene-2 having an electronegativity value of +0.092 Hartrees is maintained in the range of from 0 to 5 weight percent based on the total weight percent of the comonomer and isomers of the comonomer, preferably in the range of from 0 to 0.5 weight percent, most preferably in the range from 0 to 0.2 weight percent. In another embodiment of the process of the invention where the comonomer is 4-methyl-pentene-1, the process is essentially free of isomers having an electronegativity value less than +0.093 Hartrees.

For the purposes of this patent specification and appended claims the term "essentially free" means that the total weight percent of comonomer and its structural and positional isomers entering the reactor is such that at a maximum only 2 weight percent of these structural and positional isomers having an electronegativity value of +0.093 or less enter the reactor.

In a preferred embodiment, the process of the invention is essentially free of internal olefins that are positional and structural isomers of the comonomer excluding cis- and trans-hexene-3.

In another embodiment of the process of the invention, where the comonomer is hexene-1, the possible isomers include cis- and trans-hexene-2, cis- and trans-hexene-3, cis- and trans-3-methyl-pentene-2,2-ethyl-butene-1, 3-methyl-pentene- 1 and 2-methyl-pentene-2. It is preferable that in the process of the invention where the comonomer is hexene-1, the total of the isomers cis- and trans-3-methyl-pentene-2 and cis- and trans-hexene-2 are maintained in the range of from 0 to 5 weight percent based on the total weight percent of the comonomer and the comonomer isomers, preferably in the range of from 0 to 3 weight percent, more preferably in the range of from 0 to 0.5 weight percent, and most preferably in the range of 0 to 0.2 weight percent. In another embodiment of the process of the invention where the comonomer is hexene-1, the process is essentially free of isomers having an electronegativity value less than +0.093 Hartrees.

In another embodiment of the process of the invention, where the comonomer is octene-1, the possible isomers include cis- and trans-octene-2, cis- and trans-octene-3, cis- and trans-3-methyl-heptene-2 and cis- and trans-3-methyl-heptene-3. It is preferable that in the process of the invention where the comonomer is octene-1, the aggregate of the isomers cis- and trans-3-methyl-heptene-2, cis- and trans-3-methyl-heptene-3 and cis- and trans-octene-2 are maintained in the range of from 0 to 5 weight percent based on the total weight percent of the comonomer and isomers of the comonomer. In another embodiment of the process of the invention where the comonomer is octene-1, the process is essentially free of isomers having an electronegativity value less than +0.093 Hartrees, preferably less than that of cis- and/or trans-3-methyl-heptene-2 both having electronegativity values of +0.084, and less than cis- and trans-octene-2 having electronegativity values of +0.0904 Hartrees and +0.091 Hartrees, respectively, and cis- and trans-3-methyl-heptene-3 having electronegativity values of +0.086 Hartrees and +0.087 Hartrees, respectively.

In yet another preferred embodiment of the process of the invention the process is operated substantially free of internal, di- and tri-substituted olefins excluding cis- and trans-hexene-3 and cis- and trans-octene-3. For the purposes of this patent specification and the appended claims "substantially free" means that the process is operated and maintained with from 0 to less than 5 weight percent internal, di- and/or tri-substituted olefins based on the total weight percent of the comonomer and the di- and/or tri-substituted olefins.

In a polymerization process of propylene or propylene with ethylene or propylene and one or more comonomers such as ethylene and olefin(s) having from 4 to 20 carbon atoms, the dimer of propylene, 2-methyl-pentene-1 can be produced which may isomerize to 2-methyl-pentene-2. Since 2-methyl-pentene-2 has an electronegativity value less than +0.093 Hartrees, it is preferred that in propylene polymerization process of the invention that this isomer, 2-methyl-pentene-2, be essentially removed from the process of the invention.

In one embodiment in process of the invention, the non-polar internal olefins or isomers of the comonomer essentially removed have boiling points in the range of from about 50° C. to about 80° C., preferably in the range of from 60° C. to about 75° C., more preferably greater than 65° C. to 71° C. In another embodiment of the invention non-polar internal olefins or isomers have boiling points in the range of from about −10° C. to about 10° C. In yet another embodiment non-polar internal olefins or isomers of the comonomer have boiling points in the range of from 110° C. to about 140° C.

It has also been discovered that as the concentration of the unwanted isomer of the comonomer or internal olefin build up in the recycle system, particularly in a slurry process producing a polymer product having a density less than 0.94 g/cc, the ratio of the comonomer to monomer, i.e. hexene-1/ethylene ratio, may be increased in order to maintain the same polymer product density. As a result of increasing the comonomer concentration in the reactor, it may be necessary to lower the polymerization temperature to avoid fouling.

While not wishing to be bound to any theory, it was also noted that as the reactor temperature increases for a given set of isomer concentrations, the detrimental effect of the isomers on catalyst performance is lessened. Increasing isomer concentrations at constant temperature, typically used in a commercial process, especially a gas phase or slurry process, results in a declining catalyst performance. In order to lower the density of the polymer product desired, the mole ratio of the comonomer to monomer, for example the mole ratio of hexene-1 to ethylene, has to be increased necessitating a decrease in polymerization temperature to reduce the undesirable effect of fouling. The lower temperature enhances the impact on the catalyst of the isomers having electronegativities below +0.093 Hartrees. Thus, it is believed that the detrimental impact of the isomers, especially those having an electronegativity value less than +0.093 Hartrees, on catalyst performance is enhanced by both an increase in concentration of isomers in the reaction medium or in the reactor and by lower temperatures. This would also apply to a solution process where the effect of the isomers on catalyst performance is reduced because the catalyst is homogeneously dispersed in a liquid hydrocarbon medium. However, in a solution process as the comonomer concentrations are increased such that lower density polymer products are being produced, it is expected that raising the temperature will result in improved catalyst performance. Solution processes are described in U.S. Pat. Nos. 4,271,060 and 5,589,555, which are fully incorporated herein by reference.

In an embodiment where the process of the invention is producing a polymer product having a density less than 0.910 g/cc, preferably less than 0.905 g/cc, more preferably less than 0.900 g/cc, the presence of the isomers, for instance cis- and trans-3-methyl-pentene-2 of the comonomer with electronegativity values below +0.093 Hartrees tends toward increasing the density of the polymer product. Thus, the present invention provides for a mechanism to increase the density of the polymer product by varying the amount of isomer. It is clearly recognized that the amount of isomer used to adjust the density would detrimentally affect the process.

It is also contemplated in an embodiment of the invention, that the process is a multistage polymerization process where one reactor is operating in slurry phase that feeds into a reactor operating in a gas phase as described in U.S. Pat. No. 5,684,097 or two or more reactors each operating in a gas phase as described in U.S. Pat. No. 5,728,353 which are both fully incorporated herein by reference.

Polymer Product of the Invention

The polymers produced by this invention can be used in a wide variety of products and end-use applications. The polymers typically have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.910 g/cc, preferably greater than 0.915 g/cc.

In a slurry process, in particular, the polymers have a density in the range of from 0.87 g/cc to 0.970 g/cc, preferably in the range of from 0.88 g/cc to about 0.965 g/cc, more preferably in the range of from 0.89 g/cc to about 0.94 g/cc, most preferably less than 0.910 g/cc. In another embodiment the polymers produced by the slurry process of the invention have a density in the range of from 0.865 g/cc to 0.910 g/cc, more preferably in the range of from 0.87 g/cc to 0.905 g/cc, most preferably in the range of from 0.88 g/cc to about 0.900 g/cc.

The polymers of the invention typically have a narrow molecular weight distribution, a weight average molecular weight to number average molecular weight ($M_w/M_n$) of greater than 1.5 to about 4, particularly greater than 2 to about 3, more preferably greater than about 2.2 to less than 3. Also, the polymers of the invention typically have a narrow composition distribution. It is also contemplated that when more than one catalyst compound or specific catalyst compounds are use in the process of the invention a broad molecular weight distribution and/or composition distribution is obtainable. Also, other catalyst compounds or combinations will result in polymers having unique rheology indicative of long chain branching.

The polymer particles produced by process of the invention have a polymer particle bulk density greater than 0.3300 g/cc, more preferably greater than 0.3500 g/cc, even more preferably greater than 0.3700 g/cc, and most preferably the polymer particle density is greater than 0.4000 g/cc.

It was discovered that polymer particles produced by the process of the invention, for example where substantially pure hexene-1 is used, showed a markedly lower void content within the particles and were generally smaller in size, than for example when cis- and trans-3-methyl-pentene-2 or cis- and trans-hexene-2 are present.

Polymers produced by the process of the invention are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

The properties of the polymer were determined by the following test methods:

Density is measured in accordance with ASTM-D-1238.

MWD, or polydispersity, is a well-known characteristic of polymers. MWD is generally described as the ratio of the weight average molecular weight (Mw) to the number average molecular weight (Mn). The ratio of Mw/Mn can be measured by gel permeation chromatography techniques, or indirectly, by measuring the ratio of $I_{21}$ to $I_2$ (melt index) as described in ASTM D-1238-F and ASTM D-1238-E respectively.

Bulk Density is measured as follows; the resin is poured via a ⅞" diameter funnel into a fixed volume cylinder of 400 cc; the bulk density is measured as the weight of resin in the cylinder divided by the 400 cc to give a value in g/cc.

Particle size is determined as follows; the particle size is measured by determining the weight of the material collected on a series of U.S. Standard sieves and determining the weight average particle size.

Measuring the number of isomers is done using Gas Chromatography (GC) as is well known in the art.

Electronegativity value is calculated in Hartrees in accordance with the procedures discussed in Pearson, 107 J. Am. Chem. Soc. 6801–6806 (1985) which is incorporated herein by reference. In the article Pearson defines electronegativety ($\chi$) as $\partial E/\partial Q$ where E is the energy of a molecule and Q is the charge on the molecule. In molecular orbital models of electron structure, an expression for $\chi$ is ½(I+A), where I is the ionization potential and A is the electron affinity of the molecule. Experimental values for I and A have been used by Pearson to evaluate $\chi$'s. However, computationally $I \cong E_{homo}$ and $A \cong E_{lumo}$ where $E_{homo}$ is the orbital energy of the highest filled molecular orbital and $E_{lumo}$ is the orbital energy of the lowest unoccupied molecular orbital. Thus, electronegativity is $-\frac{1}{2}(E_{homo}+E_{lumo})$. The monomeric geometries were optimized at the STO-3G level using Gaussian 92, a general purpose quantum mechanical code. The energies of these optimized geometries were calculated at the 6–31G** basis using the non-local density functional theory, BLYP. Both Gaussian 92/DFT, Revision G.4 (available from Gaussian, Inc. Pittsburgh, Pa.) and PS-GVB Version 2.3 (available from Schroedinger, Inc. Portland Oreg.) have been used for the single point calculations in the following Table 2.

TABLE 2

| Olefin | ELECTRONEGATIVITY (Hartrees) |
|---|---|
| Ethylene | 0.116 |
| Propylene | 0.103 |
| Butene-1 | 0.104 |
| Cis-Butene-2 | 0.090 |
| Trans-Butene-2 | 0.091 |
| 2-Methyl-propene | 0.095 |
| 4-Methyl-Pentene-1 | 0.104 |
| Trans-4-Methyl pentene-2 | 0.092 |
| Cis-4-Methyl pentene-2 | 0.095 |
| 2-Methyl-pentene-2 | 0.086 |
| 2-Methyl-pentene-1 | 0.095 |
| Hexene-1 | 0.102 |
| Cis-Hexene-2 | 0.092 |
| Trans-Hexene-2 | 0.091 |
| Cis-Hexene-3 | 0.093 |
| Trans-Hexene-3 | 0.094 |
| 3-Methyl-pentene-1 | 0.103 |
| Cis-3-Methyl-pentene-2 | 0.085 |
| Trans-3-Methyl-pentene-2 | 0.086 |
| 2-Ethyl-butene-1 | 0.096 |
| 3,3-Dimethyl-butene-1 | 0.103 |
| 2,3-Dimethyl-butene-1 | 0.094 |
| 2,3-Dimethyl-butene-2 | 0.078 |
| Octene-1 | 0.102 |
| Trans-3-Methyl-heptene-2 | 0.084 |
| Cis-3-Methyl-heptene-2 | 0.084 |
| Trans-3-Methyl-heptene-3 | 0.087 |
| Cis-3-Methyl-heptene-3 | 0.086 |
| Cyclopentene | 0.090 |
| Norbornene | 0.094 |
| Trans-Octene-2 | 0.091 |
| Cis-Octene-2 | 0.090 |
| Trans-Octene-3 | 0.092 |
| Cis-Octene-3 | 0.093 |

In all the Examples below the methylalumoxane (MAO) is a 30 weight percent MAO solution in toluene available from Albemarle Corporation, Baton Rouge, La., the Davison 948 silica is available from W. R. Grace, Davison Chemical Division, Baltimore, Md. and the N,N-bis(2-hydroxylethyl) octadecylamine is available as Kemamine AS-990 from ICI Specialties, Wilmington, Del.

The bulky ligand transition metal metallocene-type catalyst compounds used in the experiments were as follows: bis(n-propylcyclopentadienyl)zirconium dichloride; bis(1-3-butylmethylcyclopentadienyl)zirconium dichloride; bis (methylcyclopentadienyl)zirconium dichloride; dimethylsilyl bis(indenyl) hafnium dichloride-racemic isomer; dimethylsilylbis(4,5,6,7-tetrahydro-indenyl) zirconium dichloride, ethylene-bis(indenyl) hafnium dichloride. Each of these metallocene-type catalyst compounds can be made in accordance with procedures well known in the art or are available from Boulder Scientific Company, Mead, Colo. The catalysts systems used in the polymerization process described below were each prepared as described below. The fresh, dry hexene-1 used in the polymerizations below has a purity of greater than about 99.2 weight percent with less than 0.1 weight percent total of the cis- and trans-isomers of hexene-2 and 3-methyl-pentene-2. The remainder of the other six carbon isomers include cis- and trans-hexene-3, 2-ethyl-butene-1 and 3-methyl-pentene-1, where hexane content was in the 0.3–0.5 weight percent range.

Example 1

Preparation of Catalyst A 1.07 liters of a 30 weight percent MAO solution in toluene, 1.6 liters of toluene and 13.5 g of bis(1-butyl-3-methyl cyclopentadienyl)zirconium dichloride in 0.14 liters of toluene were added sequentially to a stirred vessel and allowed to react for 1 hour at 80° F. (27° C.). In a separate stirred vessel 0.8 kg of 50 micron average particle size silica (Davison 948), the support material, was stirred whilst half of the prepared metallocene-type catalyst/MAO solution was rapidly added in two aliquots and then held with stirring for an additional 20 minutes. 0.45 liters of toluene was then added and the mixture stirred for a further 20 minutes. A solution of 5.7 g Kemamine AS-990 as a 10 weight percent solution in toluene was slowly added. After a further 30 minutes hold time, the reactor contents were subjected to 3 stages of vacuum 15, 20 & 25 inches Hg at 175° F. (79° C.) to remove volatiles. The resulting catalyst was dry and free flowing and was then transferred to the reactor charging vessel.

Example 2

Preparation of Catalyst B 1.07 liters of a 30 weight percent MAO solution in toluene, 1.6 liters of toluene and 11.5 g of bis(n-propyl-cyclopentadienyl)zirconium dichloride in 0.14 liters of toluene were added sequentially to a stirred vessel and allowed to react for 1 hour at 80° F. (27° C.). In a separate stirred vessel 0.8 kg of 50 micron average particle size silica (Davison 948), the support material, was stirred whilst half of the prepared metallocene-type catalyst/MAO solution was rapidly added in two aliquots and then held with stirring for an additional 20 minutes. 0.45 liters of toluene was then added and the mixture stirred for a further 20 minutes. A solution of 5.7 g Kemamine AS-990 as a 10 weight percent solution in toluene was slowly added. After a further 30 minutes hold time, the reactor contents were subjected to 3 stages of vacuum 15, 20 & 25 inches Hg at 175° F. (79° C.) to remove volatiles. The resulting catalyst was dry and free flowing and was then transferred to the reactor charging vessel.

Example 3

Preparation of Catalyst C 1.07 liters of a 30 weight percent MAO solution in toluene, 1.6 liters of toluene and 14.27 g of dimethylsilyl bis(4,5,6,7-tetrahydroindenyl)zirconium dichloride (>90 mole % racemic) in 0.14 liters of toluene were added sequentially to a stirred vessel and allowed to react for 1 hour at 80° F. (27° C.). In a separate stirred vessel 0.8 kg of 50 micron average particle size silica (Davison 948), the support material, was stirred whilst half of the prepared metallocene-type catalyst/MAO solution was rapidly added in two aliquots and then held with stirring for an additional 20 minutes. 0.45 liters of toluene was then added and the mixture stirred for a further 20 minutes. A solution of 5.7 g Kemamine AS-990 as a 10 weight percent solution in toluene was slowly added. After a further 30 minutes hold time, the reactor contents were subjected to 3 stages of vacuum 15, 20 & 25 inches Hg at 175° F. (79° C.) to remove volatiles. The resulting catalyst was dry and free flowing and was then transferred to the reactor charging vessel.

Examples 4 to 15

Polymerization Using Catalyst A

A nitrogen filled 2 liter stirred autoclave was first treated with 0.15 ml of a heptane solution containing 0.24 moles of triethyl aluminum to remove potential polar catalyst poisons. 135 ml fresh, dry hexene-1 having not been used in a previous polymerization process was charged to the autoclave followed by the addition of 800 ml of isobutane. The temperature of the autoclave was raised to 150° F. (65.6° C.) with stirring giving a total pressure of 125 psig (862 kPa). Ethylene was then injected to raise the pressure to 245 psig (1689 kPa). At this point, 100 mg of the supported Catalyst A (prepared in Example 1 above) slurried in a small amount of hexane was injected in one shot by an overpressure of ethylene. The ethylene supply valve remained open to maintain a constant 245 psig (1689 kPa) reactor pressure while monitoring the progress of the reaction from the ethylene flow rate over a period of about 40 minutes.

Table 3 below shows the impact of addition of concentrations of several $C_6$ olefin isomers (isomers of hexene-1) on the productivity of Catalyst A in producing an ethylene/hexene-1 polymer product.

TABLE 3

| Ex. | Isomer Used | Conc. of Isomer (wt. %) | Yield (g) | Prod.[1] (g/g/hr) | Density (g/cc) | $I_2$ (g/10 min) | $I_{21}/I_2$ |
|---|---|---|---|---|---|---|---|
| 4 | none | — | 111 | 1660 | 0.9001 | 0.07 | 21.2 |
| 5 | Cis- and trans- hexene-3 | 1.0 | 111 | 1660 | 0.9012 | 0.04 | n.a. |
| 6 | 3-methyl-pentene-1 | 1.0 | 108 | 1622 | 0.9025 | 0.09 | 21.1 |
| 7 | Cis-and trans- 3-methyl-pentene-2 | 1.0 | 49 | 736 | 0.9124 | 0.11 | 22.5 |
| 8 | Trans-3-methyl-pentene-2 | 1.0 | 35 | 526 | 0.9073 | 0.1 | 23.07 |
| 9 | Cis-3-methyl-pentene-2 | 1.0 | 38 | 571 | 0.9061 | 0.1 | 21.3 |
| 10 | Cis- and trans- 3-methyl-pentene-2 | 2.0 | 13 | 195 | 0.9133 | — | — |
| 11 | 2-methyl-pentene-2 | 1.0 | 97 | 1246 | 0.9016 | 0.08 | 21.46 |
| 12 | 2-methyl-pentene-2 | 0.25 | 106 | 1592 | 0.9022 | 0.09 | 21.94 |
| 13 | Trans-hexene-2 | 1.0 | 0 | 0 | — | — | — |
| 14 | Trans-hexene-2 | 0.25 | 35 | 526 | — | — | — |
| 15 | Trans-hexene-2 | 0.10 | 81 | 1216 | 0.9036 | 0.10 | 21.47 |

[1]Productivity is measured as grams of polymer per gram of catalyst per hour.

Examples 16 to 20

Polymerization Using Catalyst B

A nitrogen filled 2 liter stirred autoclave was first treated with 0.15 ml of a hexane solution containing 0.03 mmoles of triethyl aluminum to remove potential catalyst poisons. 135 ml fresh, dry hexene-1 having not been used in a polymerization process was charged to the autoclave followed by the addition of 800 ml of isobutane. The temperature of the autoclave was raised to 150° F. (65.6° C.) with stirring giving a total pressure of 125 psig (862 kPa). Ethylene was then injected to raise the pressure to 245 psig (1689 kPa). At this point, 100 mg of the supported Catalyst B (prepared in Example 2 above) slurried in a small amount of hexane was injected in one shot by an overpressure of ethylene. The ethylene supply valve remained open to maintain a constant 245 psig (1689 kPa) reactor pressure while monitoring the progress of the reaction from the ethylene flow rate over a period of about 40 minutes.

Table 4 below shows the impact of addition of concentrations of several $C_6$ olefin isomers (isomers of hexene-1) on the productivity of Catalyst B making a 0.900 density ethylene/hexene-1 copolymer.

TABLE 4

| Ex. | Isomer Used | Conc. of Isomer (wt. %) | Yield (g) | Prod.[1] (g/g/hr) |
|---|---|---|---|---|
| 16 | none | — | 298 | 8749 |
| 17 | Cis- and Trans- 3-methyl pentene-2 | 1.0 | 0 | 0 |
| 18 | Cis- and Trans- 3-methyl pentene-2 | 1.0 | 0 | 0 |
| 19 | Cis- and Trans- 3-methyl pentene-2 | 0.5 | 3 | 87 |
| 20 | Cis- and Trans- 3-methyl pentene-2 | 0.25 | 107 | 3217 |

[1]Productivity is measured as grams of polymer per gram of catalyst per hour.

Examples 21 to 22

Polymerization Using Catalyst B

A nitrogen filled 2 liter stirred autoclave was first treated with 0.15 ml of a hex ane solution containing 0.03 mmoles of triethyl aluminum to remove potential catalyst poisons. 60 ml fresh, dry hexene-1 having not been used in a polymerization process was charged to the autoclave followed by the addition of 800 ml of isobutane. The temperature of the autoclave was raised to 185° F. (85° C.) with stirring giving a total pressure of 190 psig (1310 kPa). Ethylene was then injected to raise the pressure to 325 psig (2241 kPa). At this point, 50 mg of the supported Catalyst B (prepared in Example 2 above) slurried in a small amount of hexane was injected in one shot by an overpressure of ethylene. The ethylene supply valve remained open to maintain a constant 325 psig (2241 kPa) reactor pressure while monitoring the progress of the reaction from the ethylene flow rate over a period of about 40 minutes.

Table 5 below shows the impact of addition of concentrations of several $C_6$ olefin isomers (isomers of hexene-1) on the productivity of Catalyst B making a 0.916 density ethylene/hexene-1 copolymer.

TABLE 5

| Ex. | Isomer Used | Conc. of Isomer (wt. %) | Yield (g) | Prod.[1] (g/g/hr) | Density (g/cc) | $I_2$ (g/10 min) | $I_{21}/I_2$ |
|---|---|---|---|---|---|---|---|
| 21 | none | — | 198 | 5946 | 0.9156 | 1.14 | 17.25 |
| 22 | cis- and trans- 3-methyl pentene-2 | 0.50 | 51 | 1531 | 0.9167 | 0.75 | 17.73 |

[1]Productivity is measured as grams of polymer per gram of catalyst per hour.

Examples 23 to 24

Polymerizations Using Catalyst C

A nitrogen filled 2 liter stirred autoclave was first treated with 0.15 ml of a hexane solution containing 0.15 mmoles of triethyl aluminium to remove potential polar catalyst poisons. 50 ml fresh, dry hexene-1 having not been used in a polymerization process was charged to the autoclave followed by the addition of 800 ml of isobutane. The temperature of the autoclave was raised to 150° F. (66° C.) with stirring giving a total pressure of 125 psig (862 kPag). Ethylene was then injected to raise the pressure to 245 psig (1689 kPag). At this point, 50 mg of the supported Catalyst C (prepared in Example 3 above) slurried in a small amount of hexane was injected in one shot by an overpressure of ethylene. The ethylene supply valve remained open to maintain a constant 245 psig (1689 kPag) reactor pressure while monitoring the progress of the reaction from the ethylene flow rate over a period of about 40 minutes.

Table 6 below shows the impact of addition of concentrations of several $C_6$ olefin isomers (isomers of hexene-1) on the productivity of Catalyst C making a 0.900 density ethylene/hexene-1 copolymer.

TABLE 6

| Ex. | Isomer Used | Conc of Isomer (wt. %) | Yield (g) | Prod.[1] (g/g/hr) |
|---|---|---|---|---|
| 23 | none | — | 34 | 1021 |
| 24 | Cis- and trans- 3-methyl-pentene-2 | 0.50 | 5.0 | 150 |

[1]Productivity is measured as grams of polymer per gram of catalyst per hour.

Example 25

Polymerization Process

In a commercial industrial continuous loop reactor operating with isobutane diluent, a silica supported metallocene/alumoxane catalyst system in an isobutane slurry was injected into a reactor medium containing 3.6 weight percent ethylene and hexene-1 in the 10.0 to 12.0 weight percent concentration range. Reactor temperature was maintained at 150° F. (66° C.) by cooling through the reactor wall. The hexene-1 was plant recycle material/composition having a total concentration of 0.759 weight percent cis- and trans-3 methyl-pentene-2 and 0.717 weight percent cis- and trans-hexene-2. The resulting polymer having a density in the range 0.8995 to 0.9005 g/cc was produced at a rate of 3600 lb/hr (1633 Kg/hr). When the recycle hexene-1 was replaced by 99.18 weight percent hexene-1 from the supplier containing 0.0 weight percent cis- and trans-3-methyl-pentene-2 and 0.269 weight percent cis- and trans-hexene-2, the extent of voids in the reactor granules declined significantly and the hexene-1 to ethylene ratio decreased by 7% to maintain the production of a constant density polymer product. All other reactor conditions remained constant. Subsequent replacement of the fresh hexene-1 feed by the plant recycle hexene-1 resulted in an increase in granule void formation and an increase in hexene-1 to ethylene ratio.

Example 26

Polymerization Process

In an additional test run of several days in the same reactor and process as described in Example 25 above at a reactor temperature of 150° F. (66° C.), the production rate was initially 2500 lb/hr (1134 Kg/hr) at a hexene-1/ethylene ratio of 108 gallons/thousand pounds (409 L/454 Kg). At this time the recycle hexene-1 contained 0.59 weight percent cis- and trans-hexene-2 and 0.663 weight percent cis- and trans-3-methyl-pentene-2. As the concentration of these two sets of isomers fell to 0.43 and 0.41 weight percent respectively, the production rate rose to 3480 lb/hr (1579 Kg/hr) at a hexene-1/ethylene ratio of 93 gallons/thousand pounds (352 L/454 Kg) for the same catalyst addition rate.

Examples 27 to 30

Polymer Analysis

Laboratory polymerizations were performed to produce about a 0.900 g/cc density ethylene/hexene-1 polymer product utilizing hexene-1 with varying levels of cis- and trans-3-methyl-pentene-2, isomers or olefins. The catalyst and polymerizations used were substantially the same as that described in Examples 1 and Examples 4 to 15 respectively. The following Table 7 illustrates that the polymers or particles produced by the process of the invention are substantially free of voids as measured by the particle bulk density.

TABLE 7

| Ex. | Conc. of isomer (wt. %) | Prod[1] (g/g/hr) | Morphology | Particle Bulk Density (g/cc) |
|---|---|---|---|---|
| 27 | 0 | 1636 | Almost no voids | 0.4412 |
| 28 | 0.10 | 826 | Small voids in some particles | 0.4248 |
| 29 | 0.25 | 465 | Small voids in most particles | 0.3756 |
| 30 | 0.50 | 285 | Most all particles with severe voids | 0.3305 |

[1]Productivity is measured as grams of polymer per gram of catalyst per hour.

While the present invention has been described and illustrated by reference to particular embodiments, those of ordinary skill in the art will appreciate that the invention lends itself to variations not necessarily illustrated herein. It is within the scope of the invention that a system external to the reactor for removing the unwanted isomers introduced in the process of the invention from the recycle stream may be used. This would then minimize or prevent the recycle of the isomers back into the reactor and minimize or prevent isomer build-up in the reactor system. It is preferred that such a system is placed in a gas phase process prior to the heat exchanger or compressor in the recycle stream line. In a slurry process it is preferred to place the isomer removal stage after the compressor. It is also contemplated that the removal system would be useful in a polymerization process using transitional Ziegler-Natta catalysts, including Phillips-type chromium based catalyst systems. It is further contemplated that where two or more reactors are joined that the first polymerized composition to be introduced to a second reactor is subjected to a removal process of the bad acting internal olefins. It is still even further contemplated that where two or more reactors are in series that the removal process is performed on the recycle composition of the second reactor, particularly where the first reactor is running Ziegler-Natta or Phillips-type catalysts and the second is using a metallocene-type catalyst. For this reason, then, reference should be made solely to the appended claims for purposes of determining the true scope of the present invention.

We claim:

1. A process for polymerizing olefin(s) in a reactor in the presence of a bulky ligand transition metal metallocene catalyst system, said process comprising the step of removing all or a portion of non-polymerizable internal olefins.

2. The process in accordance with claim 1 wherein the process is a gas phase process.

3. The process in accordance with claim 1 wherein the process is a slurry process.

4. The process in accordance with claim 1 wherein the internal olefins comprise at least one internal, di- and tri-substituted olefin.

5. The process in accordance with claim 4 wherein the internal olefins are internal, di- or tri-substituted olefins having an electronegativity value less than +0.093 Hartrees.

6. The process in accordance with claim 1 wherein one or more of the internal olefins are selected from the group consisting of cis-3-methyl-pentene-2, trans-3-methyl-pentene-2, cis-hexene-2, trans-hexene-2, 2-methyl-pentene-2, cis-3-methyl-heptene-2, trans-3-methyl-heptene-2, cis-3-methyl-heptene-3, trans-3-methyl-heptene-3, trans-4-methyl-pentene-2, 2-methyl-heptene-2, cis-butene-2, trans-butene-2,2-methyl-butene-2, 2,3-dimethyl-butene-2, cis-2-methyl-heptene-3, trans-2-methyl-heptene-3, cis-3-methyl-hexene-2, trans-3-methyl-hexene-2, cis-3-methyl-hexene-3, trans-3-methyl-hexene-3,2-methyl-hexene-2, cis-3-methyl-octene-2, trans-3-methyl-octene-2, cis-3-methyl-octene-3, trans-3-methyl-octene-3, 2-methyl-octene-2, cis-2-methyl-octene-3, trans-2-methyl-octene-3, cis-octene-2, trans-octene-2, cis-3-methyl-nonene-2, trans-3-methyl-nonene-2, cis-3-methyl-nonene-3, trans-3-methyl-nonene-3,2-methyl-nonene-2, cis-decene-2 and trans-decene-2.

7. The process in accordance with claim 4 wherein the at least one olefin is hexene-1 and the internal olefins are selected from one or more of the group consisting of cis-3-methyl-pentene-2, trans-3-methyl-pentene-2, cis-hexene-2, trans-hexene-2 and 2-methyl-pentene-2.

8. The process in accordance with claim 4 wherein the at least one olefin is octene-1 and the internal olefins are selected from one or more of the group consisting of cis-3-methyl-heptene-2, trans-3-methyl-heptene-2, cis-3-methyl-heptene-3, trans-3-methyl-heptene-3, cis-octene-2 and trans-octene-2.

9. The process in accordance with claim 4 wherein the at least one olefin is 4-methyl-pentene-1 and the internal olefins are 2-methyl-pentene-2, trans-4-methyl-pentene-2.

10. The process in accordance with claim 4 wherein the at least one olefin is butene-1 and the internal olefins are selected from one or more of the group consisting of cis-butene-2 and trans-butene-2.

11. The process in accordance with claim 1 wherein all the internal olefins are removed from the process.

12. The process in accordance with claim 1 wherein the process is operating for more than 12 hours from start-up of the process.

13. The process in accordance with claim 1 wherein the process is continuously operating for more than 36 hours from start-up of the process.

14. The process in accordance with claim 1 wherein the process is producing a polymer product having a particle bulk density greater than 0.3500 g/cc.

15. A continuous process for polymerizing ethylene and at least one comonomer having from 4 to 20 carbon atoms in the presence of a bulky ligand transition metallocene catalyst system in a reactor, the process comprising the step of: removing all or a portion of internal olefins and maintaining a level of the internal olefins in the process to less than 5 weight percent based on the total weight percent of the comonomer and internal olefins in the reactor.

16. The process in accordance with claim 15 wherein the internal olefins are structural and positional isomers of the comonomer.

17. The process in accordance with claim 16 wherein the level of isomers of the comonomer is maintained at less than 0.2 weight percent based on the total weight percent of comonomer and its positional and structural isomers in the reactor.

18. The process in accordance with claim 15 wherein a majority of the internal olefins have an electronegativity value less than +0.093 Hartrees.

19. The process in accordance with claim 15 wherein the internal olefins comprise at least one internal, di- or tri-substituted olefin excluding cis- and trans-hexene-3 and cis-octene-3.

20. A continuous gas process for polymerizing olefins in a reactor, said process comprising the steps of:

a) introducing a recycle stream into the reactor, the recycle stream comprising ethylene and an alpha-olefin comonomer having 4 or more carbon atoms and;

b) introducing a bulky ligand transition metal metallocene catalyst system into the reactor;

c) withdrawing the recycle stream from the reactor;

d) cooling the recycle stream;

e) introducing into said recycle stream additional monomer and additional comonomer to replace the monomer and comonomer polymerized;

f) removing all or part of the isomers from the recycle stream such that the recycle stream comprises less than 5 weight percent isomers of the comonomer based on the total weight of the comonomer and its positional and structural isomers in the recycle stream;

g) reintroducing the recycle stream into the reactor; and h) withdrawing a polymer product from the reactor.

21. The process in accordance with claim 20 wherein in the process step (g) the level of the isomers having an electronegativity value less than +0.093 Hartrees is maintained at less than 3 weight percent based on the total weight percent of the comonomer and its positional and structural isomers in the recycle steam.

22. The process in accordance with claim 20 wherein the level of the isomers is maintained at less than 0.2 weight percent based on the total weight of the comonomer and its positional and structural isomers in the recycle stream.

23. The process in accordance with claim 20 wherein the isomers are internal, di- and tri-substituted olefins excluding cis- and trans-hexene-3 and cis-octene-3.

24. The process in accordance with claim 20 wherein the at least one comonomer is butene-1 and the isomers are selected from one or more of the group consisting of cis-butene-2 and trans-butene-2.

25. The process in accordance with claim 20 wherein one or more of the isomers are selected from the group consisting of cis-3-methyl-pentene-2, trans-3-methyl-pentene-2, cis-hexene-2, trans-hexene-2,2-methyl-pentene-2, cis-3-methyl-heptene-2, trans-3-methyl-heptene-2, cis-3-methyl-heptene-3, trans-3-methyl-heptene-3, trans-4-methyl-pentene-2,2-methyl-heptene-2, cis-butene-2, trans-butene-2,2-methyl-butene-2,2,3-dimethyl-butene-2, cis-2-methyl-heptene-3, trans-2-methyl-heptene-3, cis-3-methyl-hexene-2, trans-3-methyl-hexene-2, cis-3-methyl-hexene-3, trans-3-methyl-hexene-3, 2-methyl-hexene-2, cis-3-methyl-octene-2, trans-3-methyl-octene-2, cis-3-methyl-octene-3, trans-3-methyl-octene-3, 2-methyl-octene-2, cis-2-methyl-octene-3, trans-2-methyl-octene-3, cis-octene-2, trans-octene-2, cis-3-methyl-nonene-2, trans-3-methyl-nonene-2, cis-3-methyl-nonene-3, trans-3-methyl-nonene-3,2-methyl-nonene-2, cis-decene-2 and trans-decene-2.

26. The process in accordance with claim 20 wherein the alpha-olefin comonomer is selected from one or more of the group consisting of butene-1,4-methyl-pentene-1, hexene-1, octene-1 and decene-1.

27. The process in accordance with claim 20 wherein the additional comonomer introduced into the reactor is at least 98 weight percent pure comonomer.

28. The process in accordance with claim 20 wherein the polymer product is produced at a rate greater than 1000 lbs/hr (455 Kg/hr).

29. The process in accordance with claim 20 wherein the bulky ligand transition metal metallocene catalyst has electronegativity value in the range of from +0.24 to +0.36 Hartrees.

30. The process in accordance with claim 20 wherein the process is operating for more than 12 hours from start-up of the process.

31. The process in accordance with claim 23 wherein the process is operating for more than 36 hours from start-up of the process.

32. A continuous slurry process for polymerizing ethylene and one or more comonomers having 4 or more carbon atoms in a reactor to produce a polymer product, said process comprising the steps of:

a) introducing ethylene, at least one comonomer, a diluent, and optionally hydrogen into the reactor;

b) introducing the bulky ligand transition metal metallocene catalyst system into the reactor;

c) withdrawing a slurry comprising a polymer product from the reactor;

d) depressurizing and/or heating the slurry forming a vapor containing the diluent and any unreacted ethylene and comonomer(s);

e) separating the polymer product from the vapor;

f) compressing and distilling the vapor to form a recycle composition comprising isomer(s) of the comonomer(s);

g) reintroducing the recycle composition to the reactor wherein the level of isomer(s) in the recycle composition is maintained at less than 5 weight percent based on the total weight percent of comonomer(s) comonomer and their positional and structural isomers in the recycle composition.

33. The process in accordance with claim 32 wherein the recycle composition, all or a portion thereof, in step (f), is directed to another reactor.

34. The process in accordance with claim 32 wherein prior to step (g) the recycle composition is purged of a portion of isomer(s) having an electronegativity value less than +0.093 Hartrees.

35. The process in accordance with claim 32 wherein the level of the isomer(s) of the comonomer is maintained at less than 3 weight percent based on the total weight percent of the comonomer(s) and its positional and structural isomer(s) in the recycle composition.

36. The process in accordance with claim 32 wherein the level of the isomer(s) of the comonomer is maintained at less than 0.2 weight percent based on the total weight of the comonomer(s) and its positional and structural isomer(s) in the recycle composition.

37. The process in accordance with claim 32 wherein the isomer(s) are internal, di- and tri-substituted olefins excluding cis- and trans-hexene-3 and cis-octene-3.

38. The process in accordance with claim 32 wherein the process is operating for more than 6 hours from start-up of the process.

39. The process in accordance with claim 32 wherein one or more of the isomers are selected from the group consisting of cis-3-methyl-pentene-2, trans-3-methyl-pentene-2, cis-hexene-2, trans-hexene-2,2-methyl-pentene-2, cis-3-methyl-heptene-2, trans-3-methyl-heptene-2, cis-3-methyl-heptene-3, trans-3-methyl-heptene-3, trans-4-methyl-pentene-2, 2-methyl-heptene-2, cis-butene-2, trans-butene-2, 2-methyl-butene-2, 2,3-dimethyl-butene-2, cis-2-methyl-heptene-3, trans-2-methyl-heptene-3, cis-3-methyl-hexene-2, trans-3-methyl-hexene-2, cis-3-methyl-hexene-3, trans-3-methyl-hexene-3, 2-methyl-hexene-2, cis-3-methyl-octene-2, trans-3-methyl-octene-2, cis-3-methyl-octene-3, trans-3-methyl-octene-3, 2-methyl-octene-2, cis-2-methyl-octene-3, trans-2-methyl-octene-3, cis-octene-2, trans-octene-2, cis-3-methyl-nonene-2, trans-3-methyl-nonene-2, cis-3-methyl-nonene-3, trans-3-methyl-nonene-3,2-methyl-nonene-2, cis-decene-2 and trans-decene-2.

40. The process in accordance with claim 32 wherein the bulky ligand transition metal metallocene catalyst has an electronegativity value in the range of from +0.24 to +0.36 Hartrees.

41. The process in accordance with claim 32 wherein the process is producing polymer product at a rate greater than 2000 lbs/hr (907 Kg/hr).

42. A process of producing a polyethylene copolymer in the presence of a bulky ligand transition metal metallocene catalyst system, said copolymer being polymerized from ethylene and at least one alpha-olefin comonomer having 4 or more carbon atoms, the process comprising the steps of:

a) extracting at least a portion of a first isomer of the comonomer whereby the comonomer is at least partially depleted in said first isomer;

b) polymerizing in a reactor the partially depleted comonomer and the ethylene to form a polymer product.

43. The process in accordance with claim 42 wherein the first isomer has an electronegativity value less than +0.093 Hartrees.

44. The process in accordance with claim 42 wherein the isomer(s) are internal, di- and tri-substituted olefins excluding cis- and trans-hexene-3 and cis-octene-3.

45. The process in accordance with claim 42 wherein the partially depleted comonomer comprises less than 5 weight percent structural and positional isomers of the comonomer based on the total weight percent of the comonomer entering the reactor.

46. The process in accordance with claim 42 wherein the partially depleted comonomer comprises less than 0.2 weight percent structural and positional isomers of the comonomer based on the total weight percent of the comonomer and its positional and structural isomers entering the reactor.

47. The process in accordance with claim 42 wherein the process is operating for more than 6 hours from start-up of the process.

48. The process in accordance with claim 42 wherein the process is operating for more than 12 hours from start-up of the process.

49. The process in accordance with claim 42 wherein the polymer product has a particle bulk density of greater than 0.3500 g/cc.

50. A process for polymerizing ethylene and at least one comonomer utilizing a bulky ligand transition metal metallocene catalyst system in a reactor, the at least one comonomer including at least one isomer, the process comprising: a means for preferentially extracting the at least one isomer having an electronegativity less than +0.093 Hartrees.

51. The process in accordance with claim 50 wherein the at least one isomer is an internal, di- and tri-substituted olefin.

52. The process in accordance with claim 50 wherein the at least one comonomer is an alpha-olefin having from 4 to 20 carbon atoms.

53. The process in accordance with claim 52 wherein the at least one isomer of the comonomer has a boiling point in the ranges selected from one of the group consisting of from about 50° C. to about 70° C., from about −10° C. to about 10° C. and from about 110° C. to about 140° C.

54. The process in accordance with claim 50 wherein the process further comprises maintaining in the reactor less than 5 weight percent of the at least one isomer of the comonomer based on the total weight percent of the at least one comonomer.

55. A continuous process for polymerizing ethylene and at least one comonomer in the presence of a bulky ligand transition metal metallocene catalyst compound having an electronegativity value in the range of from about +0.24 to about +0.36 Hartrees, said process operating essentially free of internal, di- and tri-substituted olefins.

56. The process in accordance with claim 55 wherein the internal olefins are isomers of the comonomer.

57. The process in accordance with claim 56 wherein the internal olefins are isomers of the comonomer having an electronegativity value less than +0.093 Hartrees.

58. The process in accordance with claim 55 wherein the process is operating for more than 12 hours from start-up of the process.

59. The process in accordance with claim 55 wherein the process is producing a polymer product having a particle bulk density greater than 0.3500 g/cc.

60. A continuous process for polymerizing an ethylene feed composition and a propylene feed composition introduced to a reactor in the presence of a bulky ligand transition metal metallocene catalyst system wherein the process comprises the step of removing all or a portion of olefin(s) having an electronegativity value less than +0.093 Hartrees.

61. The process in accordance with claim 60 wherein the olefins(s) are selected from the one of group consisting of 2-methyl-butene-2 and 2-methyl-pentene-2.

62. The process in accordance with claim 60 wherein the level of olefin(s) is maintained at less than 3 weight percent based on the total weight percent of the propylene feed composition.

63. The process in accordance with claim 60 wherein the level of the olefin(s) is less than 0.2 weight percent based on the total weight of the propylene in the propylene feed composition.

64. The process in accordance with claim 60 wherein the process is operating for more than 12 hours from start-up of the process.

65. A continuous process for polymerizing a propylene feed composition introduced to a reactor in the presence of a bulky ligand transition metal metallocene catalyst system wherein the process comprises the step of removing all or a portion of olefin(s) having an electronegavity value less than +0.093 Hartrees.

66. The process of claim 65 wherein the olefin(s) is 2-methyl-pentene-2.

67. The process in accordance with claim 65 wherein the level of the olefin(s) is less than 0.5 weight percent based on the total weight of the propylene in the recycle composition and the process is operating for more than 36 hours from the start-up.

68. The process in accordance with claim 65 wherein the level of the olefin(s) is maintained at less than 0.2 weight percent based on the total weight of the propylene in the propylene feed composition and the process is operating for more than 12 hours from the start-up.

69. The process in accordance with claim 65 wherein the level of the olefin(s) is maintained at less than 0.1 weight percent based on the total weight of the propylene in the propylene feed composition and the process is operating for more than 6 hours from the start-up.

70. A continuous gas phase process for producing a polymer product having a density greater than 0.905 g/cc to about 0.96 g/cc, a settled bulk density in the range of from 10 lb/ft$^3$ (160 kg/m$^3$) to 40 lb/ft$^3$ (600 kg/m$^3$), a particle bulk density greater than 0.3700 g/cc, the process comprising contacting from about 25 to 90 mole percent ethylene and from about 10 to 75 mole percent of a comonomer having from 4 to 8 carbon atoms in the presence of a bulky ligand transition metal metallocene compound having an electronegativity in the range of from about +0.24 to about +0.36 Hartrees, at a pressure of about 200 psig (1379 kPa) to about 400 psig (kPa), at a temperature in the range from about 30° C. to 110° C., a partial pressure of ethylene in the range of from 75 psia (517 kPa) to about 300 psia (2069 kPa); and wherein the process is producing polymer product at a rate greater than 500 lbs/hr (227 Kg/hr) to about 200,000 lbs/hr (90,900 Kg/hr) while monitoring the level of internal, di- and tri-substituted olefin isomers of the comonomer and maintaining the level of the internal, di- and tri-substituted olefin isomers of the comonomer to less than 0.2 weight percent based on the total weight percent of the comonomer and the olefin isomers of the comonomer present in a recycle stream.

71. The process in accordance with claim 70 wherein the olefin isomers of the comonomer have an electronegativity less than +0.093 Hartrees.

72. The process in accordance with claim 70 wherein the particle bulk density is greater than 0.4000 g/cc and the polymer product has a molecular weight distribution from about 2 to about 4.

73. The process in accordance with claim 70 wherein the level of olefin isomers of the comonomer is maintained at less than 0.15 weight percent based on the total weight percent of the comonomer in the recycle stream.

74. The process in accordance with claim 70 wherein the process is operating for more than 12 hours from the start-up prior to removing those olefin isomers of the comonomer having an electronegativity value less than +0.093 Hartrees.

75. A continuous slurry polymerization process for producing a polymer product having a density in the range of from 0.87 g/cc to about 0.96 g/cc, a particle bulk density greater than 0.3500 g/cc, the process comprising ethylene and a comonomer having from 4 to 8 carbon atoms in presence of a bulky ligand transition metal metallocene compound having an electronegativity in the range of from about +0.24 to about +0.36 Hartrees, at a pressure of about 400 psig (2758 KPa) to about 800 psig (5516 KPa), at a temperature in the range from about 55° C. to 104° C., a concentration of ethylene in the range of from about 2 to about 10 weight percent; and wherein the process is producing polymer product at a rate greater than 2000 lbs/hr (907 Kg/hr) while after 6 hours from start-up maintaining the level of comonomer isomer(s) selected from the group consisting of internal, di- and tri-substituted olefins excluding cis- and trans-hexene-3 and cis-octene-3 to less than 1 weight percent based on the total weight percent of the comonomer present in a recycle composition.

76. The process in accordance with claim 75 wherein the comonomer isomer(s) have an electronegativity less than +0.093 Hartrees and the particle bulk density is greater than 0.3700 g/cc.

77. The process in accordance with claim 75 wherein the level of comonomer isomer(s) are maintained at less than 0.5 weight percent based one the total weight percent of the comonomer in the recycle composition.

78. The process in accordance with claim 75 wherein the process is a loop slurry process.

79. The process in accordance with claim 75 wherein the concentration of ethylene in the reactor is in the range of from 2 to 7 weight percent.

80. The process in accordance with claim 75 wherein the comonomer isomer(s) have boiling points in the ranges selected from one of the group consisting of from about 50° C. to about 70° C., from about −10° C. to about 10° C. and from about 110° C. to about 140° C.

81. A process for polymerizing olefins in a reactor in the presence of a bulky ligand metallocene catalyst system, the process comprising a recycle system that enters and exits the reactor, the recycle system comprising a recycle composition, the recycle composition comprising monomer, comonomer, fresh comonomer, optionally hydrogen, and other inert gases, the process comprising the steps of:

(a) withdrawing the recycle composition from the reactor;

(b) removing from the recycle composition a portion of those isomer(s) of the comonomer having an electronegativity value less than +0.093 Hartrees.

82. The process in accordance with claim 81 wherein the isomer(s) removed are selected from one or more of the group consisting of internal, di- and tri-substituted olefins excluding cis- and trans-hexene-3 and cis-octene-3.

83. The process in accordance with claim 81 wherein step (b) is carried out after more than 6 hours of operation.

84. The process in accordance with claim 81 wherein the recycle composition comprises less than 3 weight percent isomer(s) of the comonomer based on the total weight percent of the comonomer present in a recycle composition.

85. The process in accordance with claim 81 wherein fresh comonomer is commercial grade hexene-1 comprising greater than 98% by weight hexene-1.

86. The process in accordance with claim 81 wherein the recycle composition entering the reactor comprises less than 5 weight percent isomers of hexene-1 after a period of more than 12 hours from start-up of the process.

87. The process in accordance with claim 81 wherein the removing step is a distillation process of all or a portion of the recycle composition to remove the isomer(s).

88. The process in accordance with claim 81 wherein the olefins in the recycle composition having a boiling point above about 67° C. are removed.

89. The process in accordance with claim 81 wherein the process is operating for more than 6 hours prior to step (b) in the process.

90. The process in accordance with claim 81 where the monomer is ethylene and the comonomer is an olefin having from 4 to 20 carbon atoms.

91. The process in accordance with claim 81 wherein the monomer and the comonomer have 4 or greater carbon atoms.

92. The process in accordance with claim 81 wherein about 70% of the isomer(s) are removed in step (b).

93. The process in accordance with claim 81 wherein about 90% of the isomer(s) are removed in step (b).

94. The process in accordance with claim 81 wherein the process is producing a polymer product having a particle bulk density greater than 0.3500 g/cc.

95. A continuous process for polymerizing olefins in a reactor having a recycle system, the process being carried out in the presence of a bulky ligand transition metal metallocene catalyst system wherein after a period of more than 6 hours or when the concentration of any or a sum of internal, di- and tri-substituted olefins excluding cis- and trans-hexene-3 and cis-octene-3 reaches a level up to about 3 weight percent in a recycle composition in the recycle system, all or portion of the olefins having an electronegativity less than +0.093 Hartrees are extracted from all or a portion of the recycle composition prior to introducing the recycle composition into the reactor.

96. The process in accordance with claim 95 wherein the level of the internal, di- and tri-substituted olefins excluding cis- and trans-hexene-3 and cis-octene-3 in the recycle composition is maintained at a level less than 0.2 weight percent.

97. The process in accordance with claim 95 wherein the period of time is more than 12 hours.

98. The process in accordance with claim 95 wherein the olefins are extracted by subjecting all or a portion of the recycle composition to distillation.

99. The process in accordance with claim 95 wherein all or a portion of the recycle system is divided into one or more streams, wherein at least one of the streams is diverted to another recycle system of a second reactor.

100. The process in accordance with claim 95 wherein a portion of the recycle composition entering the reactor is substantially free of the internal, di- and tri-substituted olefins excluding cis- and trans-hexene-3 and cis-octene-3.

101. A continuous process for polymerizing olefins in a reactor in the presence of a bulky ligand metallocene-type catalyst system, the process comprises the steps of:

(a) introducing to the reactor a fresh commercial grade comonomer, that is not recycled comonomer having a level of comonomer olefin(s) excluding ethylene and propylene of less than 0.5 weight percent based on the total weight percent of the comonomer; and (b) maintaining in the reactor an amount of internal, di- and tri-substituted olefin(s) excluding cis- and trans-hexene-3 and cis-octene-3 at less than 0.2 weight percent based on the total weight of the comonomer and comonomer olefin(s) in a recycle composition that enters the reactor.

102. The process in accordance with claim 101 wherein the amount of the internal, di- and tri-substituted olefins is maintained at less than 0.15 weight percent based on the total weight of the comonomer and comonomer olefin(s) in the recycle composition that enters the reactor.

103. The process in accordance with claim 101 wherein the comonomer is introduced to the reactor via the recycle composition.

104. The process in accordance with claim 101 wherein the level of comonomer olefin(s) is less than 0.1 weight percent based on the total weight percent of the comonomer.

105. The process in accordance with claim 101 wherein the alpha-olefin is selected one or more of the group consisting of butene-1,4-methyl-pentene-1, pentene-1, hexene-1, octene-1 and decene-1.

106. The process in accordance with claim 101 wherein the olefins polymerized in the reactor are selected from one or more of the group consisting of ethylene, propylene, butene-1, 4-methyl-pentene-1, pentene-1, hexene-1, heptene-1, octene-1 and decene-1.

107. The process in accordance with claim 106 wherein the at least one of the olefins polymerized is hexene-1 and the comonomer olefin(s) are selected from one or more of the group consisting of cis-3-methyl-pentene-2, trans-3-methyl-pentene-2, cis-hexene-2, trans-hexene-2 and 2-methyl-pentene-2.

108. The process in accordance with claim 106 wherein the at least one of the olefins polymerized is octene-1 and the comonomer olefin(s) are selected from one or more of the group consisting of cis-3-methyl-heptene-2, trans-3-methyl-heptene-2, cis-3-methyl-heptene-3, trans-3-methyl-heptene-3, cis-octene-2 and trans-octene-2.

109. The process in accordance with claim 106 wherein the at least one of the olefins polymerized is 4-methyl-pentene-1 and the comonomer olefin(s) are 2-methyl-pentene-2, and trans-4-methyl-pentene-2.

110. The process in accordance with claim 106 wherein the at least one of the olefins polymerized is butene-1 and the comonomer olefin(s) are selected from one or more of the group consisting of cis-butene-2 and trans-butene-2.

* * * * *